(12) United States Patent
Hong et al.

(10) Patent No.: US 9,857,593 B2
(45) Date of Patent: Jan. 2, 2018

(54) OPTICS DISPLAY SYSTEM WITH DYNAMIC ZONE PLATE CAPABILITY

(71) Applicant: QUALCOMM Incorporated, San Diego, CA (US)

(72) Inventors: John Hong, San Clemente, CA (US); Jian Ma, San Diego, CA (US); Chong Lee, San Diego, CA (US); Tallis Chang, San Diego, CA (US); Jay Yun, San Diego, CA (US); Robert Sean Daley, Del Mar, CA (US); Frederick Kim, Upland, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/866,463

(22) Filed: Sep. 25, 2015

(65) Prior Publication Data
US 2016/0018657 A1  Jan. 21, 2016

Related U.S. Application Data

(63) Continuation-in-part of application No. 13/740,219, filed on Jan. 13, 2013.

(51) Int. Cl.
*G02F 1/13* (2006.01)
*G02B 5/30* (2006.01)
(Continued)

(52) U.S. Cl.
CPC .......... *G02B 27/0172* (2013.01); *G02B 5/30* (2013.01); *G02B 26/106* (2013.01); *G02C 7/083* (2013.01);
(Continued)

(58) Field of Classification Search
CPC .......... G06K 7/10811; G06K 7/10831; H04N 13/0404; G09G 5/00; G06Q 30/0643;
(Continued)

(56) References Cited

U.S. PATENT DOCUMENTS

| 5,499,138 A * | 3/1996 | Iba ....................... G02B 3/0043 345/8 |
| 6,522,794 B1 | 2/2003 | Bischel et al. |

(Continued)

FOREIGN PATENT DOCUMENTS

| CN | 102754014 A | 10/2012 |
| CN | 102866506 A | 1/2013 |

(Continued)

OTHER PUBLICATIONS

International Search Report and Written Opinion—PCT/US2014/011127—ISA/EPO—Apr. 29, 2014.
(Continued)

*Primary Examiner* — Gregory J Tryder
*Assistant Examiner* — Kwang Lee
(74) *Attorney, Agent, or Firm* — QUALCOMM INCORPORATED

(57) ABSTRACT

Natural-scene light is polarized so the light exiting the polarizer and entering a glass assembly has a first polarization. Light having a second polarization substantially orthogonal to the first polarization is launched into the glass assembly and directed normal to the glass assembly and into a zone plate assembly, along with the natural-scene light. A first plurality of electric fields is established in the zone assembly to form at least one zone plate that modulates the launched light without modulating the natural-scene light. The first plurality of electric fields is disestablished and a second plurality of electric fields is established in the zone plate assembly to reposition the at least one zone plate in the liquid crystal plate. Disestablishment and establishment of electric fields is repeated at a sufficient rate so that an image (Continued)

defined by a number of pixel spots formed on a retina is perceived by a viewer.

20 Claims, 15 Drawing Sheets

(51) Int. Cl.
    *G02B 27/01*     (2006.01)
    *G02C 7/08*     (2006.01)
    *G02C 7/10*     (2006.01)
    *G02F 1/1343*     (2006.01)
    *G02B 26/10*     (2006.01)
    *G02F 1/29*     (2006.01)

(52) U.S. Cl.
    CPC ....... *G02C 7/101* (2013.01); *G02F 1/134309* (2013.01); *G02B 2027/0127* (2013.01); *G02B 2027/0147* (2013.01); *G02B 2027/0178* (2013.01); *G02F 2001/294* (2013.01)

(58) Field of Classification Search
    CPC ........... G06Q 30/0268; G06Q 30/0276; G03B 35/18; G02B 2027/0127; G02B 2027/0147; G02B 5/30; G02C 7/101
    USPC .......................................... 349/11
    See application file for complete search history.

(56) References Cited

U.S. PATENT DOCUMENTS

| | | |
|---|---|---|
| 7,408,609 B2 | 8/2008 | Yanagawa et al. |
| 8,866,702 B1 * | 10/2014 | Wong ................... G02B 27/017 345/7 |
| 2004/0108971 A1 * | 6/2004 | Waldern ............. G02B 27/0093 345/8 |
| 2009/0051863 A1 | 2/2009 | Meisner |
| 2010/0026920 A1 | 2/2010 | Kim et al. |
| 2011/0019111 A1 | 1/2011 | Morikawa et al. |
| 2011/0228181 A1 | 9/2011 | Jeong et al. |
| 2012/0154880 A1 | 6/2012 | Wu et al. |
| 2013/0286053 A1 * | 10/2013 | Fleck ..................... G09G 5/377 345/690 |
| 2013/0314649 A1 * | 11/2013 | Choi .................. G02B 27/2214 349/96 |
| 2014/0198128 A1 | 7/2014 | Hong et al. |

FOREIGN PATENT DOCUMENTS

| | | |
|---|---|---|
| EP | 0981065 A2 | 2/2000 |
| JP | 2002357804 A | 12/2002 |
| JP | 2008052177 A | 3/2008 |
| JP | 2009251236 A | 10/2009 |
| WO | WO-9300045 A1 | 1/1993 |

OTHER PUBLICATIONS

Invision, Inc. LCD Breakaway, web page, "Liquid crystal displays used in modern portable computers fall into two main types: "active" matrix (a.k.a. TFT) and "passive" matrix (a.k.a. DSTN) . . . ," http://invisionsvc.com/Services/Computer%20Displays/LCD%20Breakaway.html, Aug. 17, 2012.

* cited by examiner

OPTICS DISPLAY SYSTEM WITH DYNAMIC ZONE PLATE CAPABILITY

CROSS-REFERENCE TO RELATED APPLICATION(S)

This application is a continuation-in-part of U.S. application Ser. No. 13/740,219, entitled "Dynamic Zone Plate Augmented Vision Eyeglasses" and filed on Jan. 13, 2013, which is expressly incorporated by reference herein in its entirety.

BACKGROUND

Field

The present disclosure relates generally to augmented reality (AR) devices, e.g., AR eyeglasses, having optical see-through head mounted displays (HMD), and more particularly, to AR eyeglasses having an optics display system with dynamically moving zone plates.

Background

AR devices typically include an optical see-through HMD and one or more user input mechanisms that allow users to simultaneously see and interact with their surroundings while interacting with applications, such as e-mail and media players. AR devices also allow a user to view real-world scenes through optical see-through HMDs together with two-dimensional (2D) or three-dimensional (3D) augmented reality content displayed on the HMDs. Augmented reality content may be synthesized images, such as text and symbols, which are overlaid onto natural visual fields in an eyeglass package.

There is a fundamental optics problem of a big disparity in the focal parameters for the natural vision field, i.e., objects typically 12 inches or further away, and the overlay field, which is typically displayed on the eyeglass lens surface. Most solutions to date have bulky optics to fold the optical path length that is typically needed to solve the imaging problem. Such solutions display an overlay image as a two-dimensional (2D) collection of pixels and require the optics to form a virtual image at a far field distance (e.g., >12 inches), wherein the virtual image is subsequently reimaged by the eye lens onto the person's retina, through the eye lens. For example, in one solution, miniature liquid crystals are placed close on the eyeglass, with relay optics and a holographic coupler. These components operate together to overlay a synthetic image on the actual image being seen by the user. This solution involves a complex relay optical system and a display unit. Another problem associated with conventional augmented vision eyeglasses is the fact that people who wear prescription glasses require some adaptation of the optics to compensate for vision problems, such as near and far sightedness or astigmatism. Conventional solutions do not address this issue.

SUMMARY

An optics display system includes a polarizer, a glass assembly, a light source, and a zone plate assembly. The polarizer is configured to receive light from a natural scene and to polarize the natural-scene light so that the natural-scene light exiting the polarizer has a first polarization. The glass assembly is configured to direct light in a direction substantially normal to the glass assembly. The light source is coupled to the glass assembly and configured to launch light into the glass assembly, the launched light having a second polarization substantially orthogonal to the first polarization. The zone plate assembly includes a liquid crystal plate, a first plurality of electrodes adjacent a first side of the liquid crystal plate, a second plurality of electrodes adjacent a second side of the liquid crystal plate, and a controller. The controller is configured to establish a first plurality of electric fields between a first set of the first plurality of electrodes and a first set of the second plurality of electrodes to form at least one zone plate in the liquid crystal plate that is configured to modulate the launched light having the second polarization without modulating the natural-scene light having the first polarization. The controller is further configured to disestablish the first plurality of electric fields and establish a second plurality of electric fields between a second set of the first plurality of electrodes and a second set of the second plurality of electrodes to reposition the at least one zone plate in the liquid crystal plate.

A method, an apparatus, and a computer program product for generating a retina image by modulating optics in a retina display are provided. An apparatus generates true retina images with one or a plurality of dynamic zone plates formed in a liquid crystal device using electric fields. The dynamic zone plate is able to dynamically change the position of its optical axis relative to the eye lens axis and rapidly forms an array of the focused spots on the retina of the eye. Rapidly updating one or a plurality of zone plates can lead to gapless image synthesis across the retina. To synthesize the 2D image on the retina, the apparatus sets an electric field in a first direction that determines one or multiple focused spots on the retina in the first direction. Simultaneously, the apparatus sets an electric field in a second direction and determines the focused spots on the retina in the second direction. By repeating this row by row rapidly, a 2D gapless image is formed on the retina.

To this end, an exemplary apparatus forms a plurality of zone plates in a liquid crystal using electric fields. Each zone plate has a center, and the centers are aligned along a first axis of the display. The apparatus also moves the plurality of zone plates in a first direction along a second axis of the display different from the first axis of the display, while maintaining alignment of the centers of the plurality of zone plates along the first axis. Such movement is provided through repositioning of electric fields through the liquid crystal.

DETAILED DESCRIPTION

Figure 1:
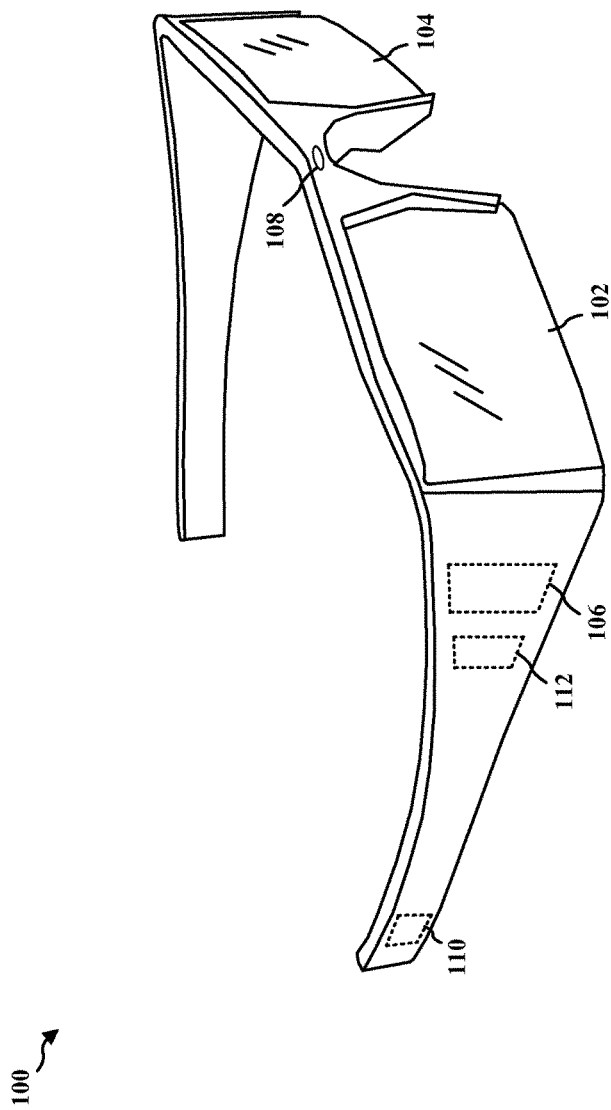
FIG. 1 is an illustration of an AR device in the form of a pair of eyeglasses.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of optics systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is an illustration of an example AR device 100 in the form of a pair of eyeglasses. The AR device 100 is configured such that the user of the device is able to view real-world scenes through optical see-through HMDs together with content displayed on the HMDs, including both two-dimensional (2D) and three-dimensional (3D) AR content. The AR device 100 may also be configured to allow the user to interact with the content and possibly with remote devices, systems or networks through wireless communication. The AR device may also provide feedback to the user as a result of such interactions, including for example, audio, video or tactile feedback. To these ends, the example AR device 100 includes a pair of optical see-through HMDs 102, 104, an on-board processing system 106, one or more sensors, such as a scene camera 108, one or more user-interaction feedback devices 110 and a transceiver 112.

Figure 2:
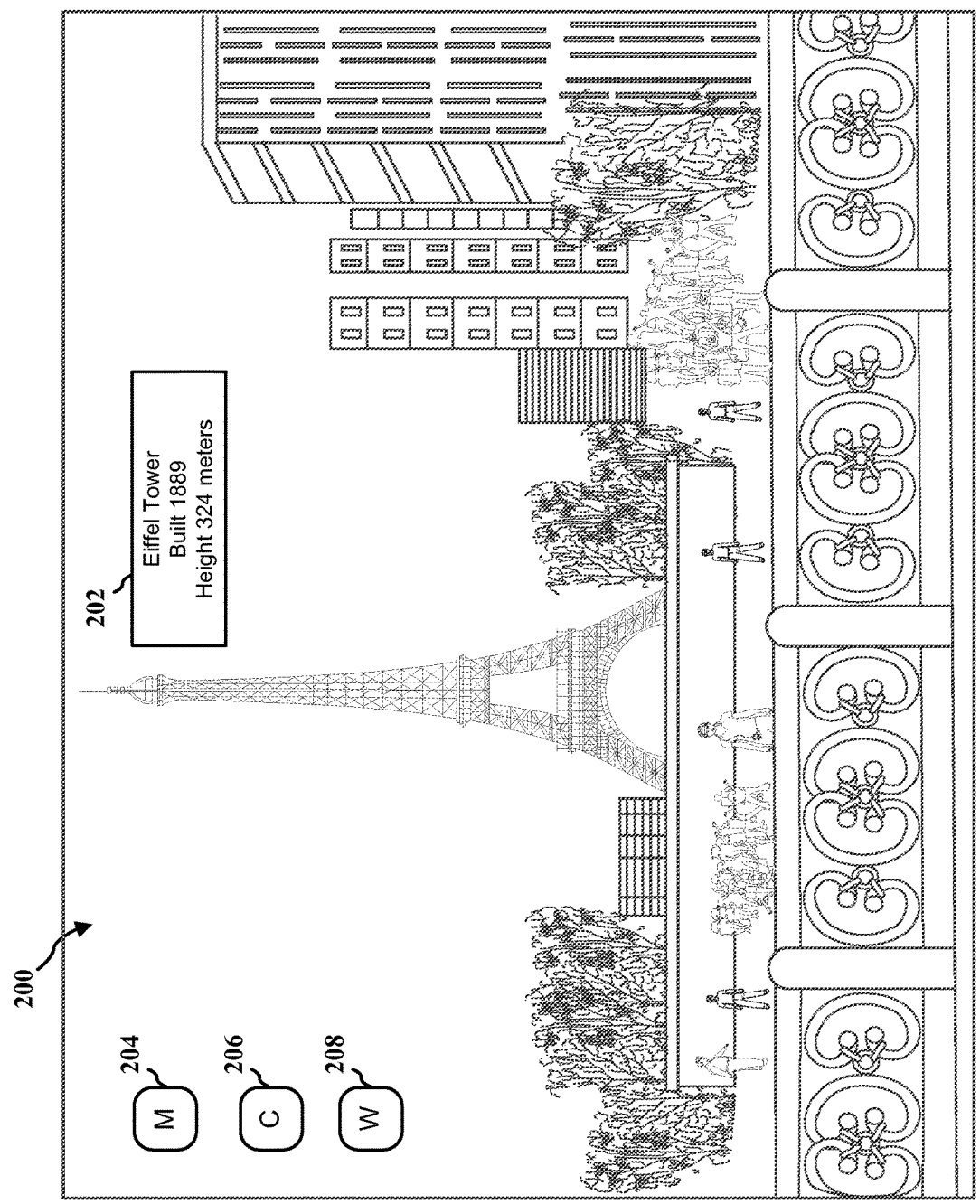
FIG. 2 is an illustration of a real-world scene through an optical see-through HMDs with augmented reality.

As mention above, the AR device 100 allows a user to view real-world scenes through optical see-through HMDs together with content displayed on the HMDs. For example, with reference to FIG. 2, as a user is viewing a real-world scene 200 through the optical see-through HMDs 102, 104, the scene camera 108 may capture an image of the scene and send the image to the on-board processing system 106. The processing system 106 may process the image and output AR content 202 for display on the HMDs 102, 104. The content 202 may provide information describing what the user is seeing. The processing system 106 may also display one or more application icons 204, 206, 208 on the HMDs 102, 104 and output application content, such as e-mails, documents, web pages, or media content such as video games, movies or electronic books, in response to user interaction with the icons.

In accordance with the following disclosure, the HMDs 102, 104 of the AR device 100 may be an optics display system having dynamic zone plate capabilities. Such an optics display system includes a zone plate assembly that forms a series of zone plates on the lens surface of the eyeglass. A dynamic array of zone plates, allows light launched as a plane wave passing normally through the zone plate to be focused onto a corresponding array of spots across the retina. The effective focal properties of the zone plates can be varied to match the viewer's lens prescription, and also account for a possible curvature of the lens surface on which it resides and provide arbitrary focal planes for the augmented visual data. The zone plates need not be implemented all at once for the entire two-dimensional display of pixels. In fact, one row can be synthesized followed by the next row and so forth, as described further below. The receptors on the retina naturally have some retention so rapidly updating the zone plates can lead to gapless image synthesis across the retina.

The optics display system described herein relies on one or more dynamically movable zone plates to create an image on a retina. A zone plate is essentially a flat lens. One type of zone plate is a Fresnel lens. A conventional Fresnel lens (not shown) has surface reliefs on it that form concentric circles. The surface relief pattern provides surface refraction properties that create the power of the lens. In operation, light rays go through the flat side of the lens. As the light exits the side with surface relief it is bent by the shape of the surface relief pattern.

The function of a zone plate is to take light coming into it from a piece of glass and focus it. For example, with reference to FIG. 7A, light 722 may be launched toward the edge 720 (e.g., the y-oriented edge) of a glass plate 704 from a light source 706, which may be a LED bar or an array of LEDs. The light 722 from the light source 706 can by polarized by a y-oriented polarizer 707 so that only y-oriented light 722a is coupled into the glass plate 704. The y-oriented light 722a is guided by total internal reflection in the glass plate 704 so a portion of the y-oriented light 722a is coupled out normal to the back surface 718, toward the zone plate assembly 708 and the eye 738.

The light 722a while guided by total internal reflection can be coupled out approximately normal to the back surface 718 by a fine grating structure and guiding structure associated with the glass plate 704. The grating structure may be within the glass plate 704 and may have a spatial frequency designed to scatter the guided light preferentially toward the eye 738, normal to the back surface 718. There may be a composite of three such gratings, each designed for a particular wavelength of light, for example, one for red (630 nm), one for green (530 nm) and one for blue (480 nm). The spatial frequency of this grating is given by the equation $K_\lambda = 2\pi/\lambda$. The composite of three such gratings would be a linear combination of the sinusoidal pattern of surface perturbations. Such a grating will minimally impact the natural scene 714a observed through glass plate 704 by virtue of its small amplitude, whereas a substantial portion of the guided light 722a can be scattered normal to the back surface 718 by virtue of its long interaction length.

The guiding structure may be a thin film guide located on the back surface 718. The thin film guide may have a thickness on the order of a wavelength and may have a higher index than the glass plate 704 to guide the light. The thin film guide allows the guided light to have a well defined propagation constant with which the sinusoidal grating can couple light out efficiently. If "neff" is the effective index that characterizes the guided light in the thin film guide, then the spatial frequency of the grating should be modified by this multiplicative factor.

The light 722a that is launched into the edge 720 of the glass plate 704 and directed out normal to the back surface 718 has no structure on it. It is just a monochromatic plane wave that impinges on a zone plate assembly 708 located on the other side of the glass plate 704. The zone plate assembly 708, takes a portion 722b of that light 722a and, in concert with the lens of the eye 738, focuses that portion of light to a spot or focal point or retina.

Figure 3:
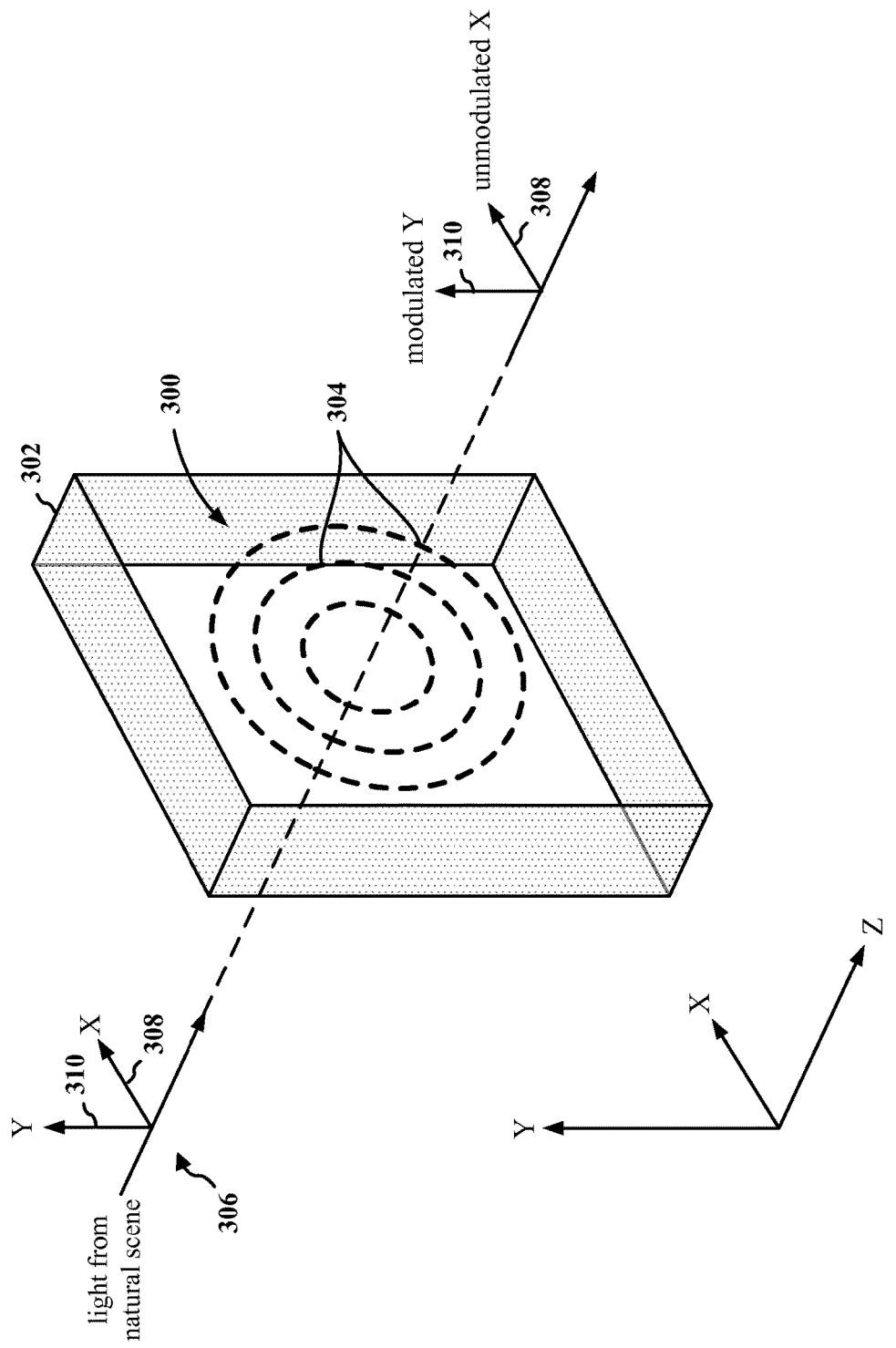
FIG. 3 illustrates a perspective view of a zone plate within a liquid crystal structure.

With reference to FIG. 3, in accordance with the optics display system disclosed herein, a zone plate 300 is created by forming Fresnel lens properties in a liquid crystal plate 302 using electric field properties, as opposed to physical surface reliefs. The electric field induces density changes in the liquid crystal so that light going through the liquid crystal encounters dense regions where the refractive index is higher and other regions where the refractive index is lower. The combination of high and low index patterns, essentially form the concentric circles 304 of the Fresnel lens zone plate and provide the refractive properties of the Fresnel lens.

In one configuration, the liquid crystal plate 302 is formed using a phase of liquid crystal known as nematic. Nematic liquid crystal includes directors that preferentially line up along one axis of the plate and is made in such a way that it only modulates the phase of one polarization of light, without affecting the other polarization, i.e., the 90 degree independent polarization. For example, as shown in FIG. 3, light 306 from a natural visual scene that a person is seeing includes both horizontally polarized light (x-oriented light) 308 and vertically polarized light (y-oriented light) 310. The liquid crystal may be made in such a way that it only modulates vertically polarized light (y-oriented light) 310 while allowing horizontally polarized light (x-oriented light) 308 to pass unmodulated. In other words, the horizontally polarized light (x-oriented light) 308 is not affected by the liquid crystal.

As noted above, a zone plate may be formed in a liquid crystal by creating an electric field through the liquid crystal. In the presence of an electric field, the plane of the liquid crystal orientation is rotated so it lines up more with the direction of the electric field direction. The effect of the electric-field induced liquid crystal orientation is immediately seen by the vertically polarized light (y-oriented light) 310. Because the directors of the liquid crystal are still basically lined up with the vibration of the electric field of the vertically polarized light (y-oriented light) 310 coming through the liquid crystal plate, the index of refraction that the vertically polarized light (y-oriented light) sees is reduced. The horizontally polarized light (x-oriented light) 308, however, is not affected by the electric-filed induced liquid crystal and passes through the liquid crystal unmodulated.

Figure 4:
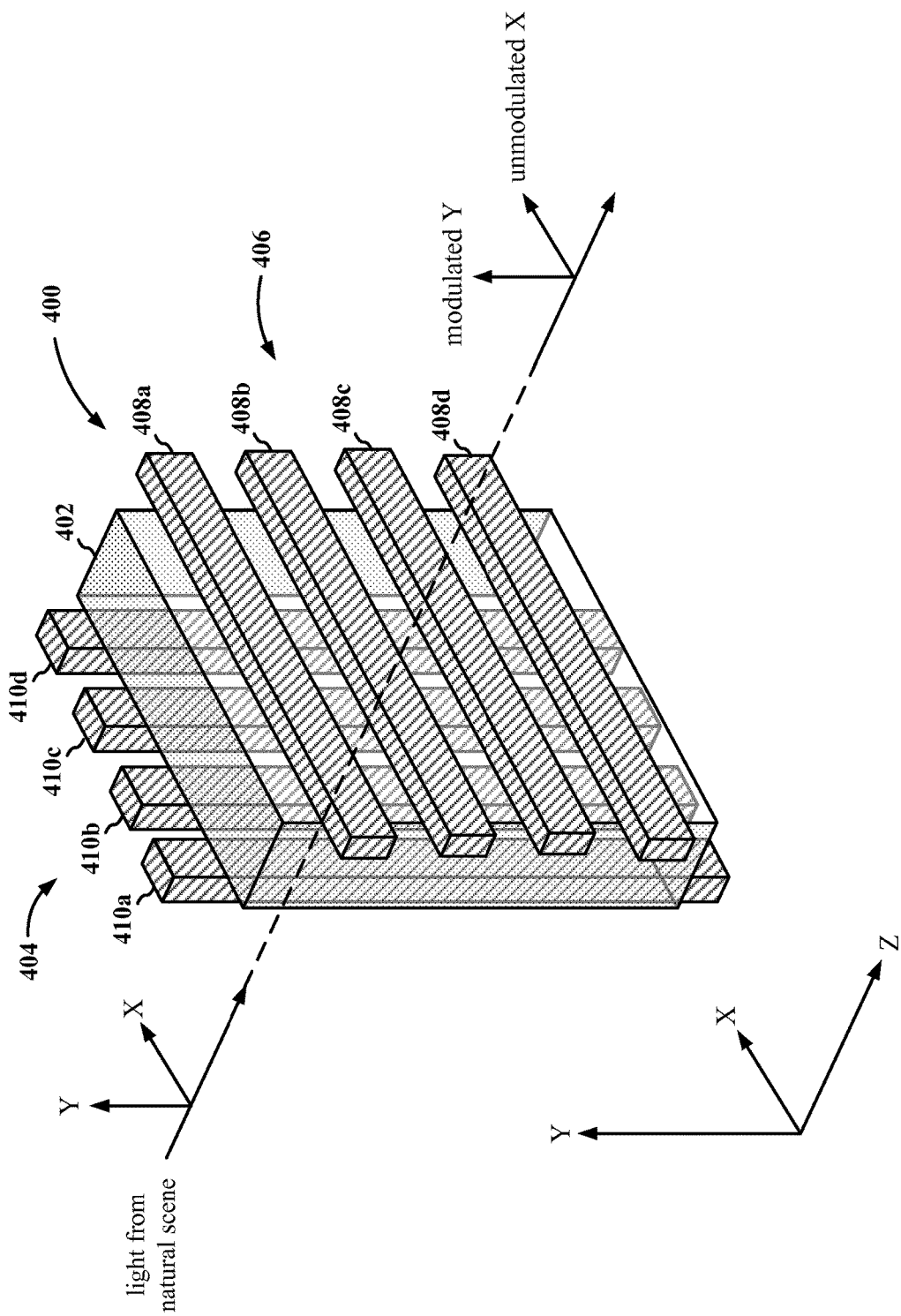
FIG. 4 illustrates a perspective view of a structure for forming zone plates within liquid crystal by the application of electric fields through the liquid crystal.

With reference to FIG. 4, a representative structure 400 for forming a zone plate like that of FIG. 3 includes a layer of liquid crystal 402 positioned between an array of vertically aligned, optically transparent finger electrodes 404 on one side of the liquid crystal 402 and an array of horizontally aligned, optically transparent finger electrodes 406 on the other side of the liquid crystal 402. For simplicity in illustration, only four vertical and four horizontal electrodes are shown. The vertical electrodes 404 and the horizontal electrode 406 work together to induce an electrical field through the liquid crystal 402. For example, in order to create a concentric circle like pattern of varying density within the liquid crystal, such activation may involve establishing DC voltage potentials between a set of vertical electrodes 404 and a set of horizontal electrodes 406, wherein a set of electrodes may include one or more electrodes.

Regarding "electric fields", one of ordinary skill in the art will understand that an electric field may be created by a voltage difference between electrodes on opposite sides of the layer of liquid crystal 402 and that, with respect to orthogonally arranged finger electrodes 404, 406, an electric field is created at the intersections of the finger electrodes. For example, with reference to FIG. 4, each horizontal finger electrode 408a, 408b, 408c, 408d on a first side of the layer of liquid crystal has a point of intersection with each vertical finger electrode 410a, 410b, 410c, 410d on a second side of the layer of liquid crystal. Details of the electrode voltage pattern are as follows. First, the liquid crystal state that is used would be the parallel aligned nematic state, in which the glass on either side of the liquid crystal gap has alignment features (typically scratches or other uniaxial topography) that are parallel. In the absence of an electric field normal to the liquid crystal 402, the liquid crystal molecules are aligned from one glass surface to the other, opposite side surface. If an electric field is impressed normal to the liquid crystal 402 in one area, the local index of refraction can either go up or down (depending on the liquid crystal material). For example, the horizontal finger electrodes 408a, 408b, 408c, 408d on one glass surface may be charged up to a positive voltage, with the pattern of voltages properly sampling the desired chirp pattern in that orientation and the orthogonal vertical finger electrodes 410a, 410b, 410c, 410d on the opposite side surface may be charged up to a negative voltage, sampling the orthogonal chirp. The areas where the orthogonal electrodes cross will have much higher electric field values than the electric field created in between same side electrodes. As such, any electric field created between adjacent horizontal electrodes 408a, 408b, 408c, 408d on the same side of the liquid crystal 402, or between adjacent vertical electrodes 410a, 410b, 410c, 410d same side of the liquid crystal 402 does not affect the electric fields created between electrodes on the opposite sides of the liquid crystal 402. The polarity of the voltages need to be switched from frame to frame, so as to reduce the DC field load on the material which can cause problems with the material degrading over time.

Figure 5:
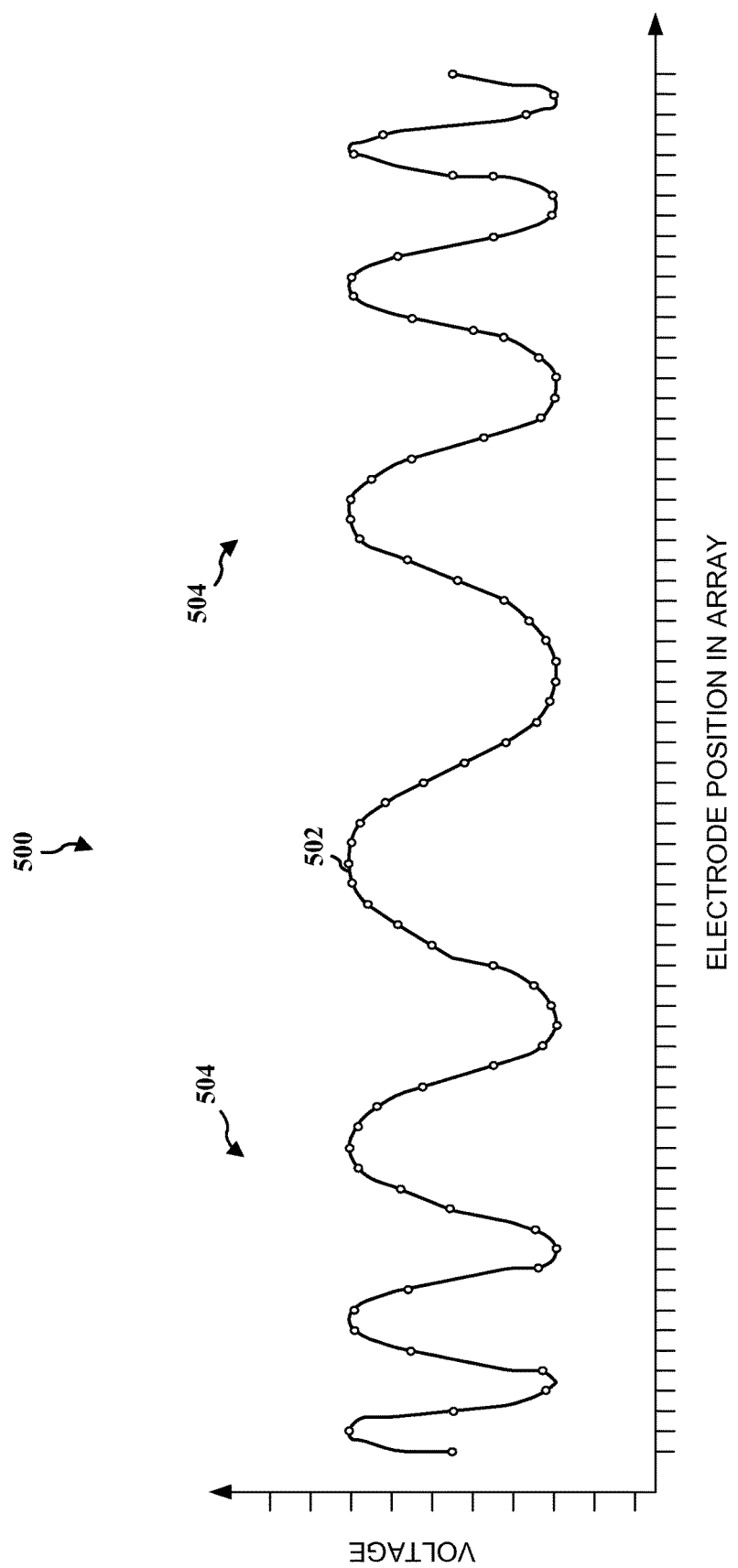
FIG. 5 illustrates a spatial chirp formed by plotting electrode array positions as a function of applied voltages.

With reference to FIG. 5, in one configuration, a set of voltages having varying DC values may be applied to a set of electrodes in an array of vertically arranged, spaced apart electrodes, or an array of horizontally arranged, spaced apart electrodes. The voltages may range, for example, from between 0 V and 5 V, with the specific voltage range being a function of the liquid crystal material, the layer thickness and the wavelength of light. The voltage range on the orthogonal array of electrodes could have a negative range of values, from between 0 V and −5 V, so that the overlap areas between the two electrode sets will see a voltage difference range of 0 to 10 V. Periodically the assignment of the negative and positive voltage ranges would be reversed to ensure that static electric fields in the liquid crystal layer are not sustained, which could lead to deterioration of the material. Plotting points corresponding to electrodes along the electrode array as a function of applied voltages and connecting the points forms a waveform characterized as a "spatial chirp." This characterization is evident in FIG. 5, which depicts a chirp waveform 500. The spatial chirp, also referred to herein as a "chirped sinusoid" or a "chirped distribution" includes a center peak 502 and side peaks 504 on two sides of the center peak. The distance between the side peaks becomes smaller and smaller as a function of distance from the center peak 502, in accordance with typical quadratically modulated frequency modulate waveforms.

Figure 6:
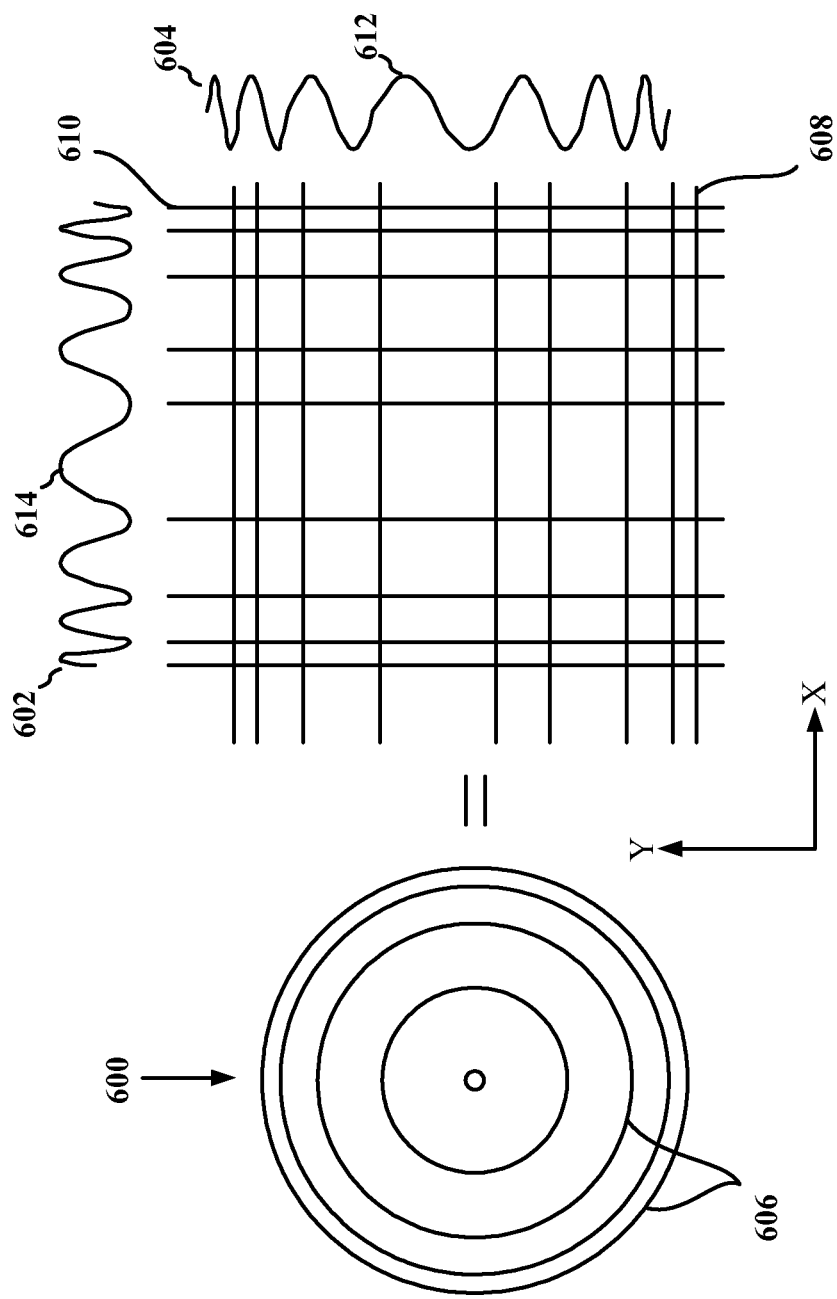
FIG. 6 illustrates a decomposition of a zone plate into an x component and y component.

With reference to FIG. 6, a zone plate 600 having a particular face pattern across a 2D surface may be formed by a pair of spatial chirps 602, 604, each applied to a respective set of electrodes. The horizontal chirp 602 may be applied to a set of vertically arranged electrodes and the vertical chirp 604 may be applied to a set of horizontally arranged electrodes. For clarity of illustration, electrodes are not shown in FIG. 6. The zone plate 600 may be as small as on the order of 1 mm×1 mm in size or as large as the optic on which it is defined. The electrode resolution requirement can be calculated by considering the field of view of the image augmentation. A 4 degrees of field of view is more than adequate to cover the higher fidelity visual field for the eye (full angle). This results in the requirement that the electrode properly sample the highest spatial frequency grating that would give rise to the largest angle scattering. 2 degrees of scatter, from the surface normal, requires a sampling frequency of $2 \sin \theta / \lambda$ where $\theta$ is the scatter angle. Using 0.5 um as the nominal wavelength, this requirement leads to a spatial frequency that needs to be as high as 140 lines per mm.

The zone plate pattern may be separable into an x variation and a y variation. For example, a chirped sinusoid applied in the x direction, i.e., the upper horizontal chirp 602, that has a frequency that varies linearly across, produces a one dimensional image. Likewise, the same chirped sinusoid applied in the y direction, i.e., the right side vertical chirp 604, produces another one dimensional image. The chirp applied in the x direction and the chirp applied in the y direction may be identical in terms of absolute value of voltages, but one is defined by positive voltage values while the other is defined by negative voltage values so as to give rise to non-zero electric fields. Multiplying these two one-dimensional zone plates together produces a two-dimensional zone plate 600 having concentric circles 606.

Mathematically the zone plate 600 may be described by a circularly symmetric set of fringes 606 and is separable into a product of fringes oriented along the x axis 608, also referred to as horizontal fringes, and fringes oriented along the y axis 610, also referred to vertical fringes. This has an important implication in terms of how the optical display system is implemented. Because of this separability property, the electrode pixel structure need not be a 2D array but can be synthesized as a concatenation of two one-dimensional (1D) arrays. The horizontal fringe 608 component of the zone plate 600 ensures focusing onto any particular pixel row in a display and the vertical fringe(s) 610 component of the zone plate 600 picks out the particular pixel column(s) in a display onto which light is focused.

An array of imaged pixels may be formed row by row, by applying the vertical chirp 604 to a first plurality or set of horizontal electrodes, successively moving the entire vertical chirp 604 down the y axis by successively moving the center 612 of the chirp down the y axis to thereby apply the vertical chirp 604 to a second plurality or set of horizontal electrodes offset from the first set of electrodes. The offset between the first set of electrodes and the second set of electrodes may be one horizontal electrode. The x-axis oriented zone plate formed by applying the horizontal chirp 602 to a plurality or set of vertical finger electrodes cause the display dependent pixels to be imaged onto particular locations for the row formed by the vertical chirp 604.

Likewise, an array of imaged pixels may be formed column by column, by applying the horizontal chirp 602 to a first plurality or set of vertical electrodes, successively moving the entire horizontal chirp 602 across the x axis by successively moving the center 614 of the chirp across the x axis to thereby apply the horizontal chirp 602 to a second plurality or set of vertical electrodes offset from the first set of electrodes. The offset between the first set of electrodes and the second set of electrodes may be one vertical electrode. The y-axis oriented zone plate formed by applying the vertical chirp 604 to a plurality or set of horizontal finger electrodes cause the display dependent pixels to be imaged onto particular locations for the column formed by the horizontal chirp 602.

Figure 7A:
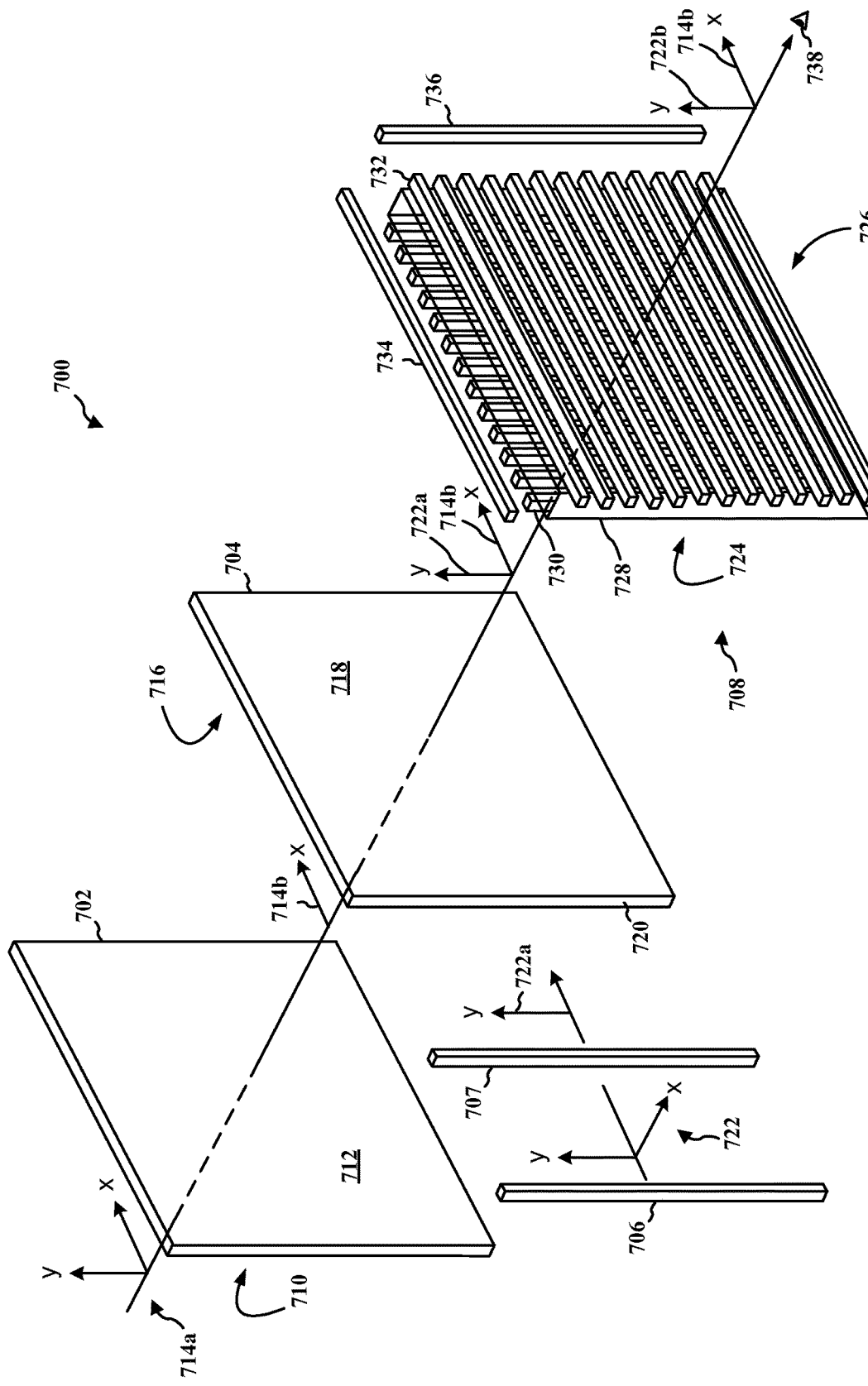
FIG. 7A illustrates an exploded perspective view of an optics display system with dynamic zone plate capability.
Figure 7B:
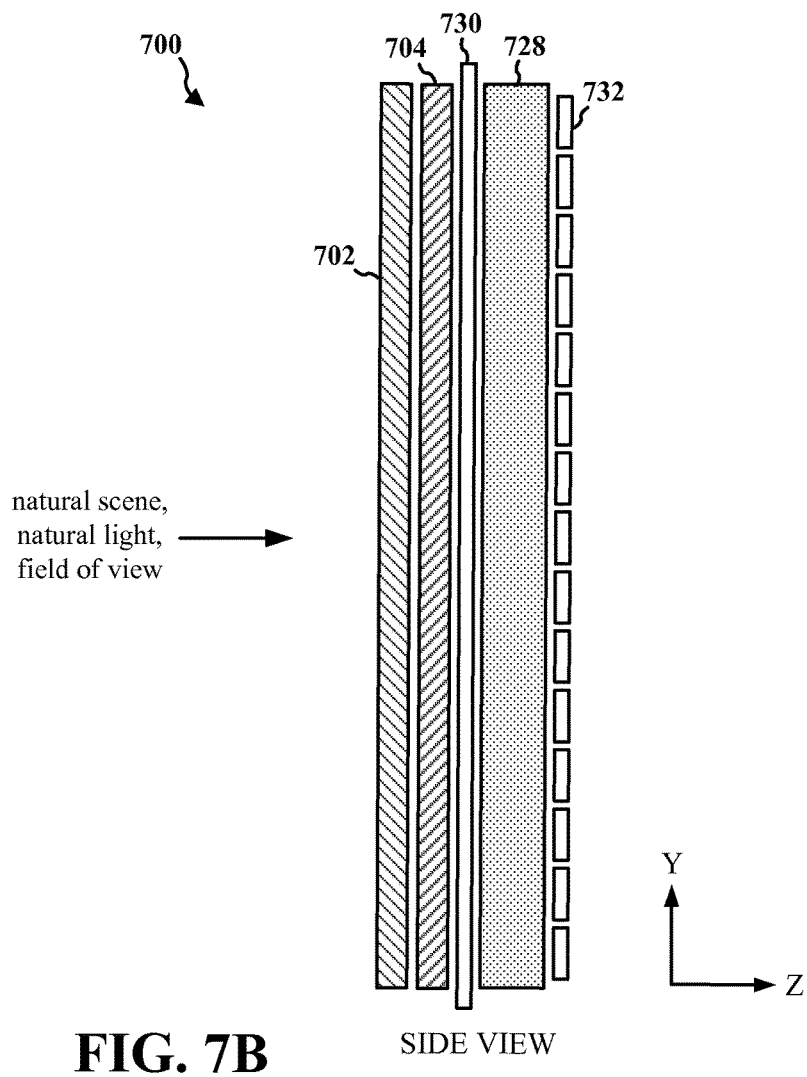
FIG. 7B illustrates a side view of an assembled optics display system of FIG. 7A taken along the y-z axis.
Figure 7C:
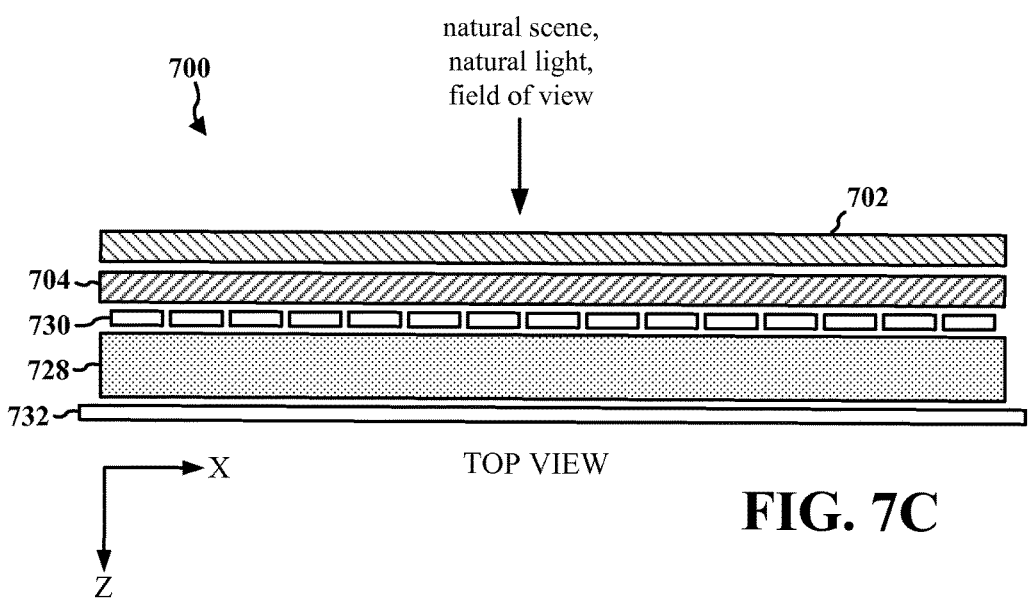
FIG. 7C illustrates a top view of an assembled optics display system of FIG. 7A taken along the x-z axis.

With reference to FIGS. 7A, 7B, and 7C, a configuration of an optics display system 700 includes a polarizer 702, a glass plate 704, a light source 706, and a zone plate assembly 708. The polarizer 702 includes a front surface 710 and a back surface 712. The polarizer 702 is configured to receive randomly polarized light 714a from a natural scene and to polarize the natural-scene light such that the natural-scene light 714*b* exiting the polarizer has a first polarization. For example, the polarizer 702 may be a horizontal polarizer, in which case vertical polarized light is blocked by the polarizer and the only light that passes through the polarizer is horizontally polarized (x-oriented light) 714*b*.

The glass plate 704 or lens has a front surface 716 adjacent the back surface of the polarizer 702, a back surface 718, and one or more side surfaces or edges 720. The glass plate 704 is configured to direct natural-scene light 714*b* received through its front surface 716 and launched light 722*a* received through one or more side surfaces or edges 720 through its back surface 718 in a direction substantially normal to its back surface.

The light source 706 is coupled to the glass plate 704 and configured to launch light 722*a* into the glass assembly through at least one of the one or more side surfaces or edges 720 of the glass assembly. The light source 706 may be a set of LEDs. As previously explained, the launched light 722*a* has a second polarization substantially orthogonal to the first polarization of the natural-scene light 714*b*. For example, the second polarization may be vertically polarized light (y-oriented light). For clarity of illustration, only one light source 706 is shown in FIG. 7A. Additional light sources may be located at different sides of the glass plate 704. The polarization of the launched light 722*a* may be provided by a polarizer 707 located between the light source 706 and the side surface or edge 720 of the glass assembly, as described above.

Launched light 722*a* from one or more light sources 706 may by guided by the glass plate 704 from one side surface, e.g. left side, to the opposite side surface, e.g., right side. Along the way, a portion of the launched light 722*a* is redirected toward the back surface 718 of the glass plate 704. As previously explained, in one configuration, the launched light 722*a* encounters a refractive pattern, e.g., fine scratches, in the glass plate 704 that directs a part of the launched light 722*a* to leak out the back surface 718 in a direction normal to the surface of the glass plate 704. These scratches basically turn part of the light 90 degrees from within the plane to normal out of the plane. In another configuration, the launched light 722*a* may encounter an holographic coupler (not shown).

The zone plate assembly 708 has a front side 724 adjacent the back surface 718 of the glass plate 704 and a back side 726. The zone plate assembly 708 includes a liquid crystal plate 728, a first plurality of electrodes 730 adjacent the front side 724 of the liquid crystal plate, and a second plurality of electrodes 732 adjacent the back side 726 of the liquid crystal plate. The first plurality of electrodes 730 may be an array of vertically aligned, optically transparent finger electrodes. The second plurality of electrodes 732 may be an array of horizontally aligned, optically transparent finger electrodes.

The electrodes 730, 732 are substantially transparent in the visible spectrum and do not have optical properties that affect light passing through the optics display system 700. The vertical electrodes 730 are connected to a column driver 734 that controls activation of the vertical electrodes, for example by controlling the application of voltages to the electrodes. The horizontal electrodes 732 are connected to a row driver 736 that controls activation of the horizontal electrodes, for example by controlling the application of voltages to the electrodes. The electrodes 730, 732 may be coated with an optically transparent and electrically non-conductive material for isolating the electrodes and optically hiding them.

The zone plate assembly 708 further includes a controller or processing system (not shown) configured to establish a first plurality of electric fields between a first set of the vertical electrodes 730 and a first set of the horizontal electrodes 732 to form a plurality of zone plates in the liquid crystal. The controller or processing system may correspond to the processing system 106 of FIG. 1. The controller may establish these electric fields by controlling the column driver and the row driver to output voltages to the first set and second set of electrodes having values corresponding to the values of a chirp distribution. As explained above, the voltages applied to the vertical electrodes 730 and the horizontal electrodes 732 induce an electrical field through the liquid crystal plate 728 to form one or more zone plates in the liquid crystal plate 728. To this end, activation of the electrodes may involve establishing a DC voltage potential between a single vertical electrode 730 and a plurality of horizontal electrodes 732 or between a single horizontal electrode and a plurality of vertical electrodes or a plurality of vertical electrodes and a plurality of horizontal electrodes.

As explained above, the liquid crystal plate 728 of the zone plate assembly 708 is configured so that it only modulates the launched light 722*a* having a polarization substantially orthogonal to the polarization of the natural-scene light 714*b*. Accordingly, one or more zone plates formed in the liquid crystal plate 728 do not perturb the natural-scene light 714*b* at all. Any effect of the zone plates is invisible to the natural scene light 714*ba* and the natural-scene light will pass through the zone plate unaffected.

The light 722*b* exiting the front surface 726 of the zone plate assembly 708 is a modulation of the launched light 722*a* that is affected by one or more zone plates formed in the liquid crystal plate 728. A pattern imparted by the one or more zone plates gets impressed on the launched light 722*a*. The launched light 722*b* exiting the zone plate assembly 708 travels through the lens of the eye 738 and is further focused to a spot on the retina. The spot has the same polarization as the modulated launched light 722*b*. On the same retina, the unmodulated natural-scene light 714*b* having a polarization orthogonal to the launched light is also focused on the retina by the lens of the eye 738.

Figure 8:
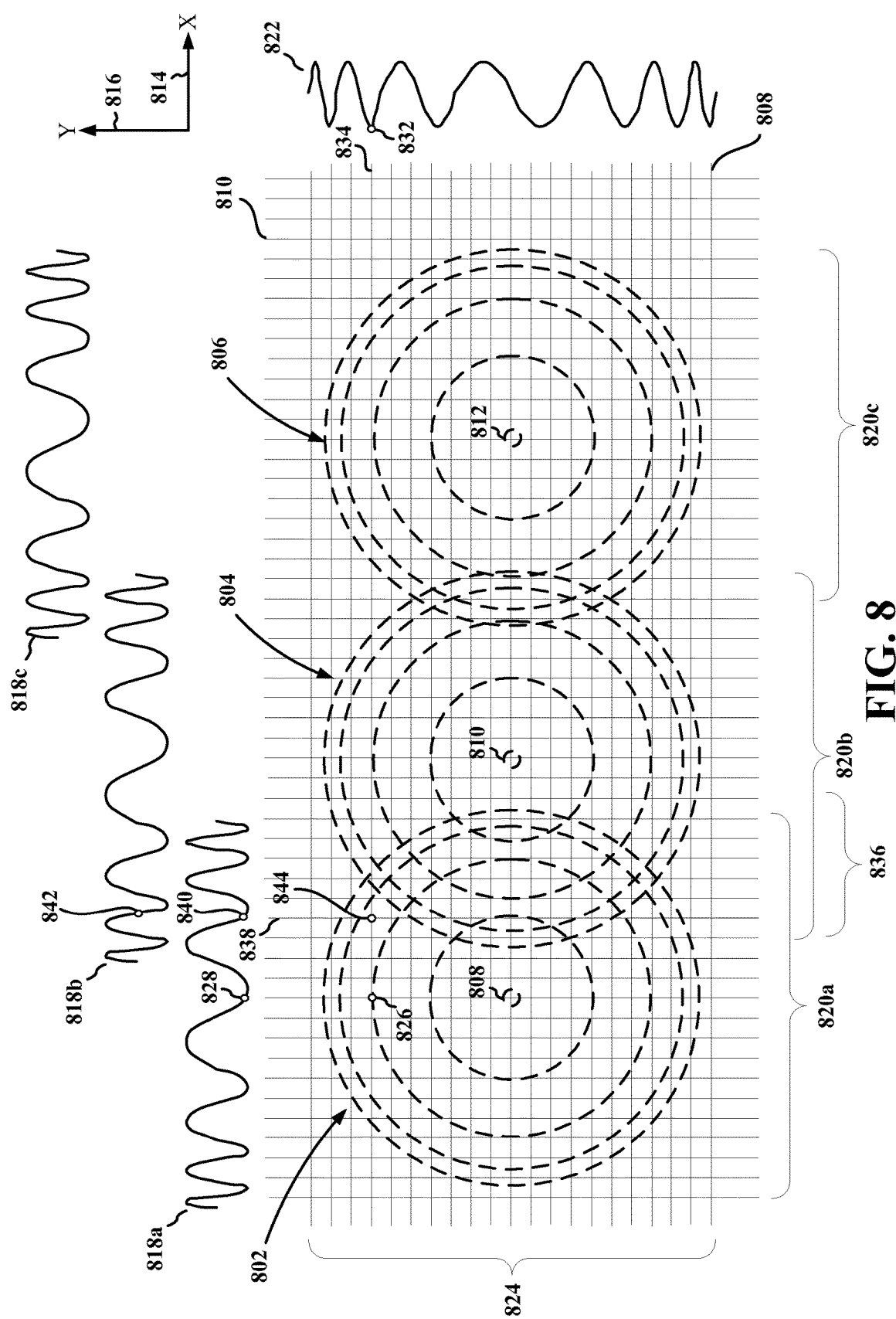
FIG. 8 illustrates a plurality of overlapping zone plates, each formed using a set of horizontal electrodes and a set of vertical electrodes.

With reference to FIG. 8, each zone plate 802, 804, 806 formed by a zone plate assembly 708 has a respective center 808, 810, 812 wherein the centers may be aligned along a first axis 814 of the zone plate assembly. The first axis may be the x axis 814. Each zone plate 802, 804, 806 is configured to modulate the light launched by a light source 706 having the second polarization 722*a* without modulating the natural-scene light 714*b* having the first polarization. Such configuration is provided by the combination of the properties of the liquid crystal plate 728 and the electric fields applied through the liquid crystal plate that define the zone plate. As described above, the liquid crystal may be formed such that the effect of the zone plates is limited to light having the second polarization, i.e., the launched light, while light having a first polarization substantially orthogonal to the second polarization, i.e., natural-scene light, passes through unaffected.

The controller may be further configured to disestablish the first plurality of electric fields by controlling the column driver and the row driver to remove the voltages from the first set of vertical electrodes 730 and the first set of horizontal electrodes 732. The controller may be further configured to establish a second plurality of electric fields between a second set of the vertical electrodes 730 and a second set of the horizontal of electrodes 732. In one configuration, the second set of the vertical electrodes 730 is different from the first set of vertical electrodes, while the second set of horizontal electrodes 732 is the same as the first set of horizontal electrodes. For example, the second set of vertical electrodes 730 may be displaced from the first set of horizontal electrodes by a number of electrodes, e.g., one electrode 730. As such, the plurality of zone plates 802, 804, 806 may be displaced or moved in a first direction along a second axis 816, e.g., the y axis, of the zone plate assembly 708 different from the first axis 814 of the zone plate, while maintaining alignment of the centers 808, 810, 812 of the plurality of zone plates along the first axis, e.g., the x axis.

With continued reference to FIG. 8, three zone plates 802, 804, 806 may be formed by applying three respective chirps 818a, 818b, 818c to three respective subsets of the vertical electrodes 820a, 820b, 820c, each chirp having a chirp distribution centered at one of the vertical electrodes 810; and by applying a single chirp 822 to a set of the horizontal electrodes 824 having a chirp distribution centered at one of the horizontal electrodes 808. The chirps 818a, 818b, 818c applied to the sets of vertical electrodes 820a, 820b, 820c have a spatial shift in relation to each other such that their respective centers align with a different vertical electrode 810 while there is some overlap of electrodes included in the respective electrode sets. For example, the spatial distribution between the first chirp 818a and the second chirp 818b is such that the first vertical electrode subset 820a to which the first chirp 818a is applied has some vertical electrodes 810 in common with the second vertical electrode subset 820b to which the second chirp 818b is applied. Likewise, the spatial distribution between the second chirp 818b and the third chirp 818c is such that the second vertical electrode subset 820b to which the second chirp 818b is applied has some vertical electrodes 810 in common with the third vertical electrode subset 820c to which the third chirp 818c is applied. Because the center of the vertical chirp distribution 822 is applied only to one of the horizontal electrodes 808, the centers of the zone plates 802, 804, 806 are collinear along a horizontal line 814 on the display all along the same row. Therefore the spots formed on the retina by these zone plates 802, 804, 806 lie on a single horizontal line or row on the retina.

Regarding "electric fields", as mention above, one of ordinary skill in the art will understand that an electric field is created by a voltage difference between electrodes and that, with respect to orthogonally arranged finger electrodes 808, 810, on opposite sides of a liquid crystal plate, an electric field is created at the intersections of the finger electrodes. Furthermore, one of ordinary skill in the art will understand that the voltage difference at a point of intersecting electrodes may be a function of one or more chirp distributions applied to the intersecting electrodes. For example, the voltage difference at intersection 826 is the difference between the horizontal chirp voltage 828 applied to the vertical electrode 830, and the vertical chirp voltage 832 applied to the horizontal electrode 834.

When there are common electrodes 836 among respective electrode subsets 820a, 820b, the voltage applied to each common electrode may be a summation of the chirp distributions being applied to the common electrode. For example, for vertical electrode 838, which is common to both zone plate 802 and zone plate 804, the voltage applied to the vertical electrode is the summation of the horizontal chirp voltage 840 from the first horizontal chirp distribution 818a and the horizontal chirp voltage 842 from the second horizontal chirp distribution 818b. The voltage difference at the intersection 844 is the difference between the summation of horizontal chirp voltages 840 and 842 applied to the vertical electrode 838 and the vertical chirp voltage 832 applied to the horizontal electrode 834. Accordingly, the application of two different chirp distributions to different respective electrode subsets having one or more common electrodes may be obtained by summing the respective voltage distributions for the common electrodes. To this end, the controller may be configured to determine respective chirp distributions to be applied to respective electrode subsets, to further determine any common electrodes among the electrode subsets, and to determine voltages to be applied to common electrodes.

Figure 9A:
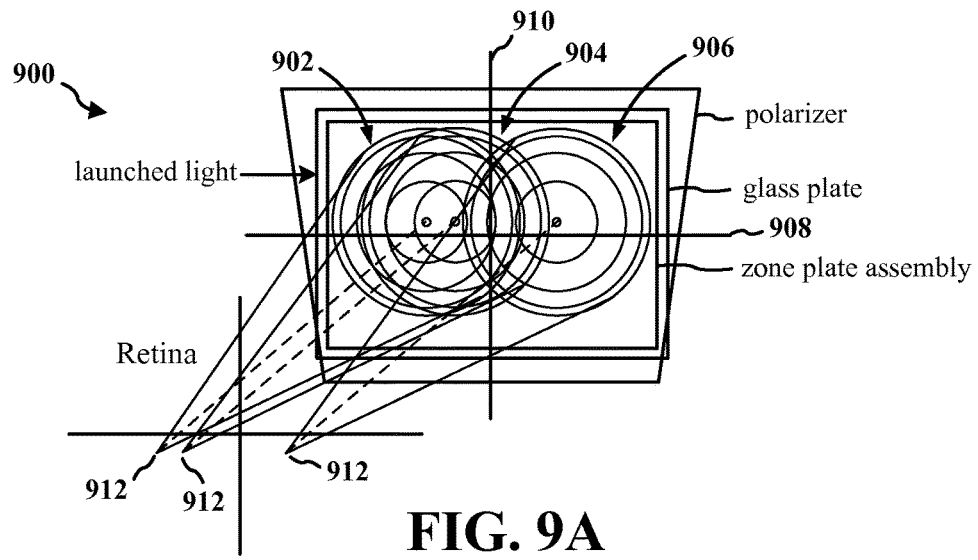
FIGS. 9A, 9B and 9C illustrate progressive vertical and horizontal movement of overlapping zone plates on a display.
Figure 9B:
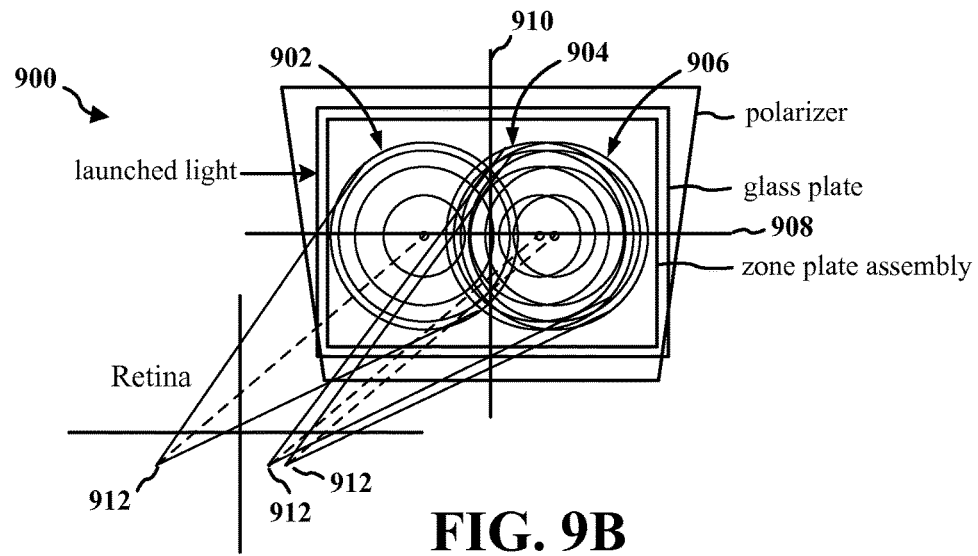
Figure 9C:
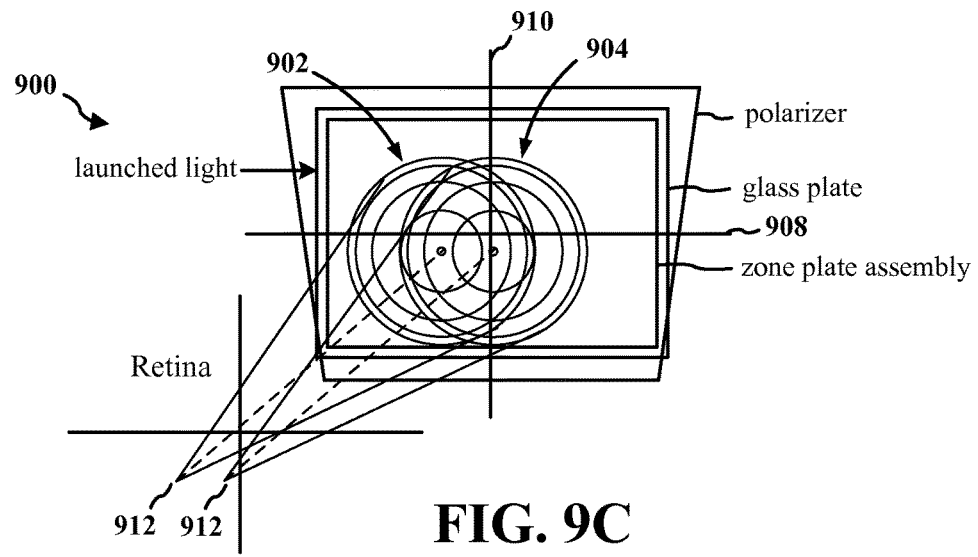

With reference to FIGS. 9A, 9B and 9C, a series of diagrams illustrate dynamic movement of zone plates 902, 904, 906 within an optics display system 900 relative to a retina located on the backside of the optics display system. The zone plates 902, 904, 906 are partially overlapped or superimposed on top of each other in two directions on a zone plate assembly of the optics display system 900. The zone plate assembly may operate in a raster scan type operation, wherein the overlapping arrangement of zone plates 902, 904, 906 is refreshed along the x-axis 908 and moved vertically along the y axis 910, one pixel at a time.

As described above, the zone plates 902, 904, 906 are formed by the zone plate assembly through the application of electric fields in a liquid crystal plate. The function of the zone plates 902, 904, 906 is to take a portion of light coming into the front side of the zone plate assembly and focus it to a retina. The light coming into the front side of the zone plate assembly may be provided by a glass assembly having side light launched into it. When the center of a zone plate 902, 904, 906 is moved over, laterally along the x axis 908 on the zone plate assembly, the focus spot, e.g., focal point 912, on the retina moves with it. Multiple zone plates 902, 904, 906 produce multiple focal points 912 and define a spatial distribution of points or spots that can be formed on a retina.

With reference to FIG. 9A, three zone plates 902, 904, 906 are formed by applying a respective horizontal chirp to each of three different subsets of the set of vertical electrodes, and by applying a single vertical chirp to a set of horizontal electrodes having a chirp distribution centered at one of the horizontal electrodes. The horizontal chirps applied to the subsets of vertical electrodes have some spatial shift in relation to each other. For example, the centers of the horizontal chirps may be offset from each other by a number of electrodes. Because the center of the vertical chirp distribution is applied only to one of the horizontal electrodes, the centers of the zone plates 902, 904, 906 are collinear along a horizontal line on the display all along the same row. Therefore the focal points 912 form by the zone plates on the retina also lie on a single horizontal line or row on the retina.

With reference to FIG. 9B, the centers of the three zone plates 902, 904, 906 are displaced horizontally along the x axis 908 by applying a respective horizontal chirp to each of three different subsets of the set of vertical electrodes. For example, the horizontal chirp forming zone plate 904 in FIG. 9A may be applied to a different subset of electrodes such that the center of the zone plate is displaced horizontally by a number of vertical electrodes to place the zone plate 904 in a location shown in FIG. 9B. The zone plates 902, 904, 906 may also be displaced vertically by applying a vertical chirp to the horizontal electrodes such that the entire vertical chirp distribution is shifted down one row, thereby placing the center of the vertical chirp distribution at the horizontal electrode that is one below the horizontal electrode that previously had a vertical chirp center applied to it. As such, the focal points 912 formed on the retina by these zone plates 902, 904, 906 move vertically down by one row or one pixel, relative to the spots formed on the retina by the chirp distribution of FIG. 9A.

With reference to FIG. 9C, the centers of two zone plates 902, 904 are displaced horizontally along the x axis 908 by applying a respective horizontal chirp to different subsets of the set of vertical electrodes. In FIG. 9C, the horizontal chirp distributions are applied to vertical electrodes such that only two zone plates 902, 904 are formed. The zone plates 902, 904 are displaced even further down along the y axis 910 by one pixel. The process of shifting zone plates laterally along the x axis 908 and vertically along the y axis 910 may be repeated, on a row-by-row basis, for the entire display by driving the vertically oriented electrodes with the appropriate chirps to control the horizontal position of the focal points 912 and the horizontally oriented electrodes to control the vertical position of the focal points.

The foregoing synthesize of focal points 912 by vertical movement of horizontally aligned, overlapping zone plates 902, 904, 906 produces acceptable results when overlapping zone plates exist along only one axis. Simultaneous formation and movement of overlapping zone plates along the vertical axis and horizontal axis would result in degeneracy.

Application of the dynamic zone plates described herein may be expanded to accommodate a person's vision characteristics. For example, the glass plate of the optics display system may be a prescription lens. To account for the fact that the zone plate assembly that produces synthesized images is between the prescription lens and the retina, particular chirped distributions may be applied to form zone plates that impart a power correction to the synthesized image to adapt for a person's eye prescription.

Figure 14:
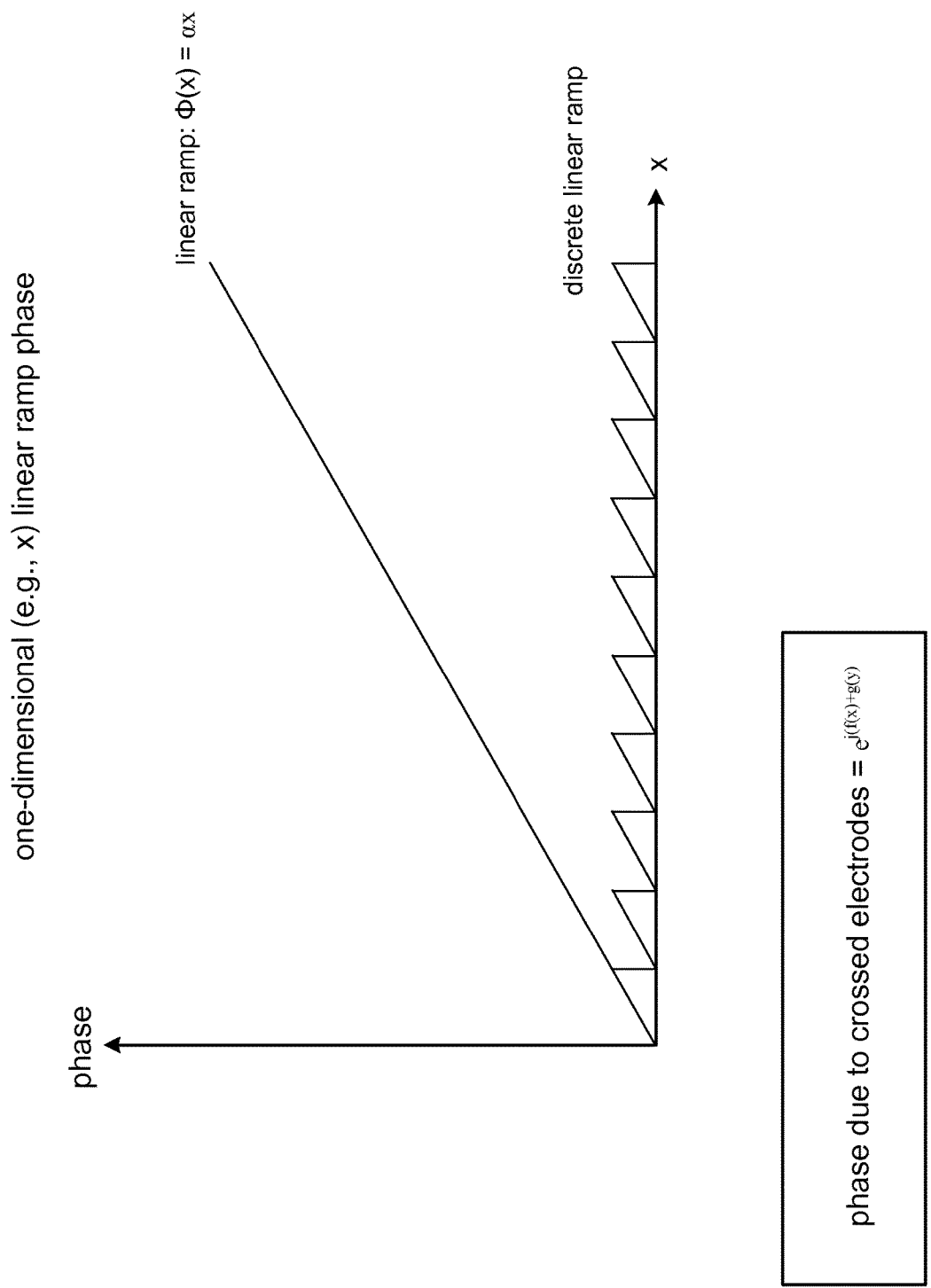
FIG. 14 is a graph illustrating one-dimensional linear ramp phase and discrete ramp phase functions.

For example, if the eyeglass optic (e.g., the glass plate 704) is flat (e.g., no eye prescription) and the eye 738 lens is perfectly accommodating, the proper spatial modulation to be applied to the light 722a that is scattered by the surface coupler (e.g., zone plate assembly 708) to yield one spot in the retina is a linear ramp in both x and y orientations. FIG. 14 illustrates a linear ramp $\varphi_x(x) = \alpha x$ associated with the x orientation. A linear ramp $\varphi_y(y) = \beta y$ would apply to the y orientation. Mathematically, a combination of the linear ramps in the x and y orientations is equivalent to a phase function given by $\varphi(x,y) = \alpha x + \beta y$ where the parameters $\alpha$ and $\beta$ determine the position of the spot in the retina.

Multiple spots may be made by the optics display system of FIG. 7A by either temporally multiplexing many such phase functions $\varphi(x, y) = \alpha x + \beta y$ in time, or area-modulating many discrete linear ramp functions (as shown in FIG. 14), with each area/patch relegated to a unique pair of parameters ($\alpha$, $\beta$). The crossed one dimensional structure of the electrodes 730, 732 only allows one orientation of the electrodes to be spatially multiplexed, so in this case for example, the phase function $\varphi_x(x) = \alpha x$ of the x oriented electrode 732 may remain fixed while the phase functions $\varphi_y(y) = \beta y$ associated with the group of y oriented electrodes 730 selected to form a zone plate with the x oriented electrode 732 are spatially multiplexed.

If the glass plate 704 is not flat but instead is curved due to an eye prescription lens and/or the eye 738 has some aberrations, the phase pattern of the x oriented electrodes and y oriented electrodes may be augmented to compensate for these nonlinearities (as opposed to the linear phase patterns shown in FIG. 14). The phase pattern may be approximated by higher order polynomial functions (e.g., $e^{j(f(x)+g(y))}$). The composite of the nonlinear phase pattern with the optical power of a glass plate 704 having an associated curvature, for example, results in an optics display system that can impart a power correction to the synthesized image to adapt for the eye prescription associated with the lens.

The optics display system of FIGS. 7A-7C, 8, and 9A-9C may be considered to be formed of various functional elements. For example, the display system may include means for receiving light from a natural scene and polarizing the natural-scene light such that the natural-scene light exiting the means for receiving and polarizing has a first polarization. The receiving and polarizing means may be, for example, a polarizer 702, or equivalents thereof.

The display system may also include means for launching light into a glass assembly and directing the light in a direction substantially normal to the glass assembly, the launched light having a second polarization substantially orthogonal to the first polarization. The means for launching light may be a light source 706 that outputs light into the side 720 of a glass plate 704. The light source may be, for example, one or more LEDs. The means for directing light may be a feature included in the glass assembly, such as scratches, or an additional component, e.g., a holographic coupler, coupled to the glass assembly.

The display system may further include means for establishing a first plurality of electric fields in a liquid crystal plate 728 to form at least one zone plate in the liquid crystal plate, the at least one zone plate configured to modulate the launched light having the second polarization without modulating the natural-scene light having the first polarization. The means for establishing a first plurality of electric fields may include a first plurality of electrodes 730 adjacent a first side 724 of a liquid crystal plate 728 and coupled to a column driver 734. The means for establishing the first plurality of electric fields may also include a second plurality of electrodes 732 adjacent a second side 726 of the liquid crystal plate 728 and coupled to a row driver 736. Each of the column drivers 734 and row drivers 736 is configured to output voltages to electrodes, and each is coupled to a controller. The controller may be part of the means for establishing a first plurality of electric fields and may be configured to cause the column driver 734 to apply a voltage to each electrode 730 in a first set of vertical electrodes; and to cause the row driver 736 to apply a voltage to each electrode 732 in a first set of horizontal electrodes.

The display system may further include means for disestablishing the first plurality of electric fields and establishing a second plurality of electric fields in the liquid crystal plate to reposition the at least one zone plate in the liquid crystal plate. The means for disestablishing the first plurality of electric fields may include the controller, wherein the controller is configured to cause the column driver 734 and row driver 736 to stop applying voltages to their respective sets of electrodes 730, 732.

The means for establishing a second plurality of electric fields may include the first plurality of electrodes 730 adjacent the first side 724 of the liquid crystal plate 728. The means for establishing the second plurality of electric fields may also include the second plurality of electrodes 732 adjacent the second side 726 of the liquid crystal plate 728. A controller may be part of the means for establishing a second plurality of electric fields and may be configured to cause the column driver 734 to apply a voltage to each electrode 730 in a second set of vertical electrodes; and to cause the row driver 736 to apply a voltage to each electrode 732 in a second set of horizontal electrodes. In some cases the second set of vertical electrodes may be different from the first set of vertical electrodes while the second set of horizontal electrodes is the same as the first set of horizontal electrodes, such that the zone plate is repositioned laterally on the display. In other cases the second set of vertical electrodes may be the same from the first set of vertical electrodes while the second set of horizontal electrodes may be different from the first set of horizontal electrodes, such that the zone plate is repositioned vertically on the display. In some cases, both the second set of vertical electrodes may be the different from the first set of vertical electrodes and the second set of horizontal electrodes may be different from the first set of horizontal electrodes, such that the zone plate is repositioned laterally and vertically on the display.

Figure 10:
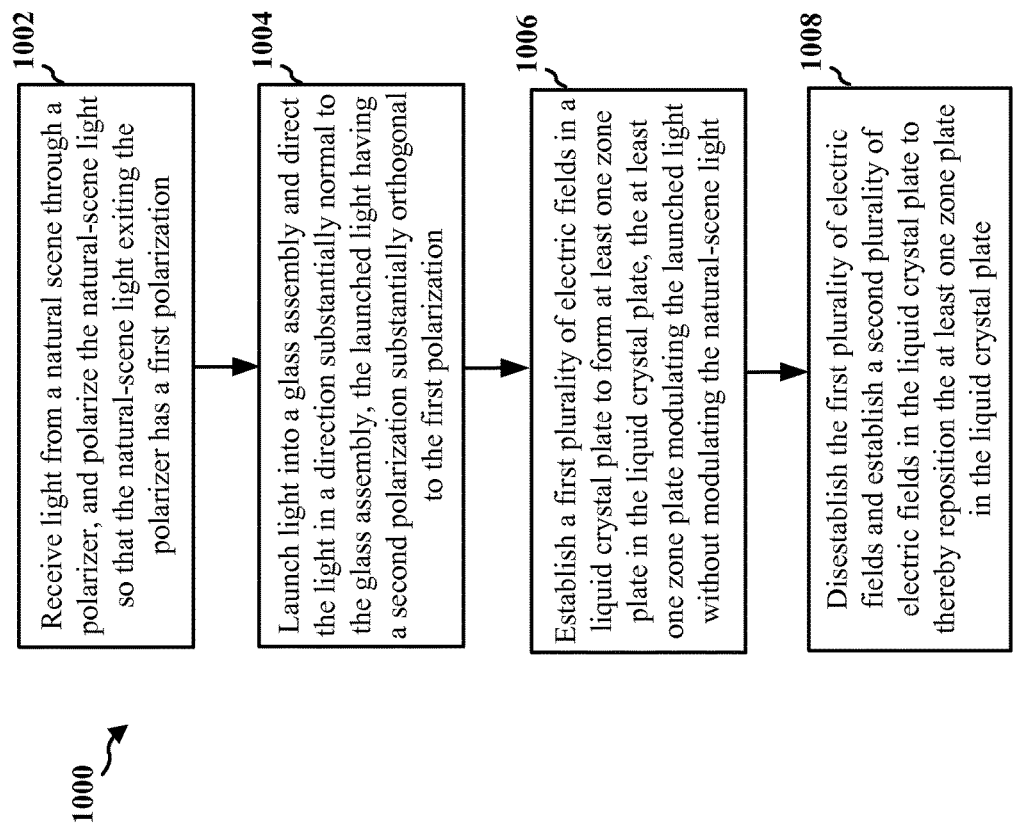
FIG. 10 is a flow chart of a method of forming an image in the optics display system of FIGS. 7A-7C, 8, and 9A-9C.

FIG. 10 is a flow chart of a method of forming an image in an optics display system, such as the display system shown in FIGS. 7A-7C and FIGS. 9A-9C. At 1002, light 714a from a natural scene is received through a polarizer 702. The natural-scene light 714a is polarized so that the natural-scene light exiting the polarizer 702 has a first polarization 714b. At 1004, light 722a is launched into a glass plate 704 and directed in a direction substantially normal to the glass assembly. The launched light 722a has a second polarization substantially orthogonal to the first polarization 714b.

At 1006, a first plurality of electric fields is established in a liquid crystal plate 728 to form at least one zone plate 902, 904, 906 in the liquid crystal plate. The at least one zone plate 902, 904, 906 is configured to modulate the launched light 722a having the second polarization without modulating the natural-scene light 714b having the first polarization. The modulated launched light 722b output by the liquid crystal plate 728 forms a spot on the retina. The first plurality of electric fields may be established by applying a voltage to each electrode 730 in a first set of a first plurality of electrodes adjacent a first side 724 of the liquid crystal plate 728, and applying a voltage to each electrode 732 in a first set of a second plurality of electrodes adjacent a second side 726 of the liquid crystal plate.

At 1008, the first plurality of electric fields is disestablished and a second plurality of electric fields is established in the liquid crystal plate 728 to reposition the at least one zone plate 902, 904, 906 in the liquid crystal plate. Again, the at least one zone plate 902, 904, 906 is configured to modulate the launched light 722a having the second polarization without modulating the natural-scene light 714b having the first polarization. The modulated launched light 722b output by the liquid crystal plate 728 forms a spot on the retina. The second plurality of electric fields may be established by applying a voltage to each electrode 730 in a second set of the first plurality of electrodes, and applying a voltage to each electrode 732 in a second set of the second plurality of electrodes.

The process of disestablishing and establishing electric fields in the liquid crystal plate to reposition the at least one zone plate may be repeated a number of times at a sufficient rate to form a number of spots on the retina so that the viewer will perceive a particular letter or number. For example, the zone plate may be repositioned fifty times within a given time frame to form fifty spots that define a letter. Once the letter is formed, the process of creating the letter (e.g., forming the fifty spots that define the letter) may be continuously repeated for as long as the letter is to be displayed.

In one implementation, a single zone plate 902 may be formed and repositioned multiple times along an axis at a fast enough speed so that the repositioning of a pixel spot on the retina of a viewer is perceived as a line on the display. The speed may be for example, 30 msec to render a complete set of points for one image. In this implementation, the zone plate 902 may be repositioned by electric fields both vertically and horizontally on the display so that the single pixel spot traces the outline of a letter or number to be perceived by the viewer.

In another implementation, the first plurality of electric fields form a plurality of zone plates 902, 904, 906, each zone plate having a center, wherein the centers are aligned along a first axis 908 of the zone plate assembly 708, and the second plurality of electric fields reposition the plurality of zone plates 902, 904, 906 along a second axis 910 of the zone plate assembly while maintaining alignment of the centers of the plurality of zone plates along the first axis. In this implementation, multiple pixel spots or focal points 912 are formed on the retina at the same time. For example, a number of horizontally aligned pixel spots may form a row of pixels that define part of a letter, part of a number, or part of different letters that form a word.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

Figure 11:
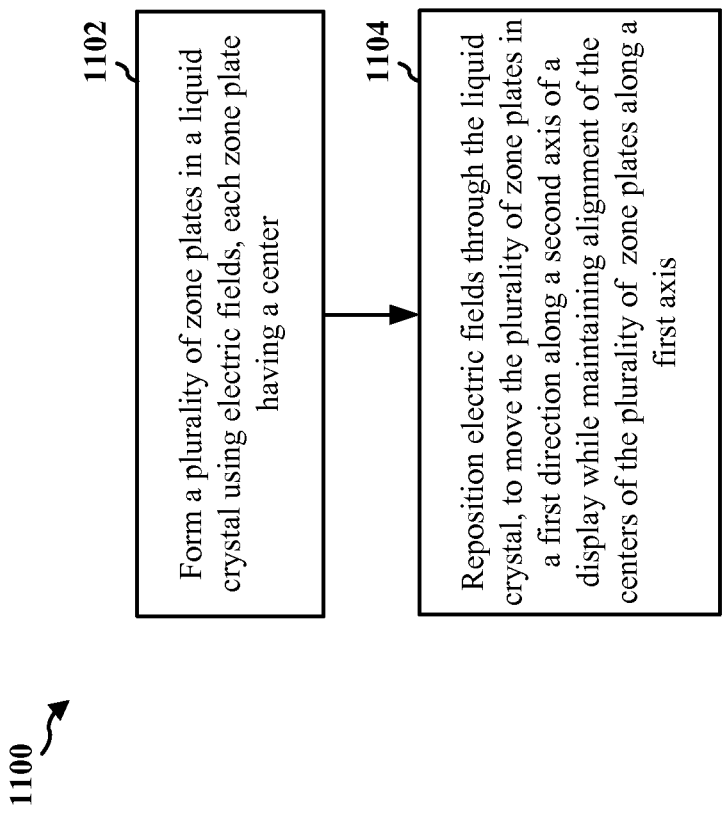
FIG. 11 is a flow chart of a method of modulating optics through dynamic zone plate movement.

FIG. 11 is a flow chart 1100 of a method of modulating optics through dynamic movement of zone plates. The method may be performed by a liquid crystal apparatus. At step 1102, the apparatus forms a plurality of zone plates in a liquid crystal using electric fields. Each zone plate has a center and the centers are aligned along a first optical axis of the plate. The optical axis of each zone plate determines the location of image pixels on eye retina. The zone plates may be formed by establishing electric fields between a plurality of electrode sets on a first side of the liquid crystal and an electrode set on a second side of the liquid crystal. One way of establishing these electric fields is to apply a set of voltages of varying values to each of the plurality of electrode sets on the first side, and a set of voltages of varying values to the electrode set on the second side.

At step 1104, the apparatus moves the plurality of zone plates in a first direction along a second axis of the display different from the first axis of the display, while maintaining alignment of the centers of the zone plates along the first axis. Such movement is provided by repositioning electric fields through the liquid crystal. In one configuration, each set of voltages applied to an electrode set defines a chirp distribution having a center corresponding to a first-side center electrode, in the case of voltages applied to electrode sets on the first side, or a second-side center electrode in the case of voltages applied to the electrode set on the second side. The intersections of each first-side center electrode and the second-side center electrode define a respective center for one of the zone plates.

The zone plates are moved by shifting at least one of the chirp distributions applied to an electrode set on the first side so that the corresponding first-side center electrode changes, while maintaining the chirp distribution applied to the electrode set on the second side so that the second-side center electrode is unchanged. This maintains alignment of the zone plates along one axis of the display. For example, if the first axis is the horizontal axis of the display, and the second axis is the vertical axis, the zone plates may move together vertically, while their centers remain aligned horizontally. To accomplish such vertical movement, the plurality of zone plates may be moved by shifting the chirp distributions applied to the electrode set on the second side so that the corresponding second-side center electrode changes. In one configuration, the chirp center is shifted one electrode from the current electrode. Alternatively, or in addition, one or more zone plates may move horizontally across the display by shifting one or more respective chirp distribution along the array of vertically arranged finger electrodes.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

Figure 12:
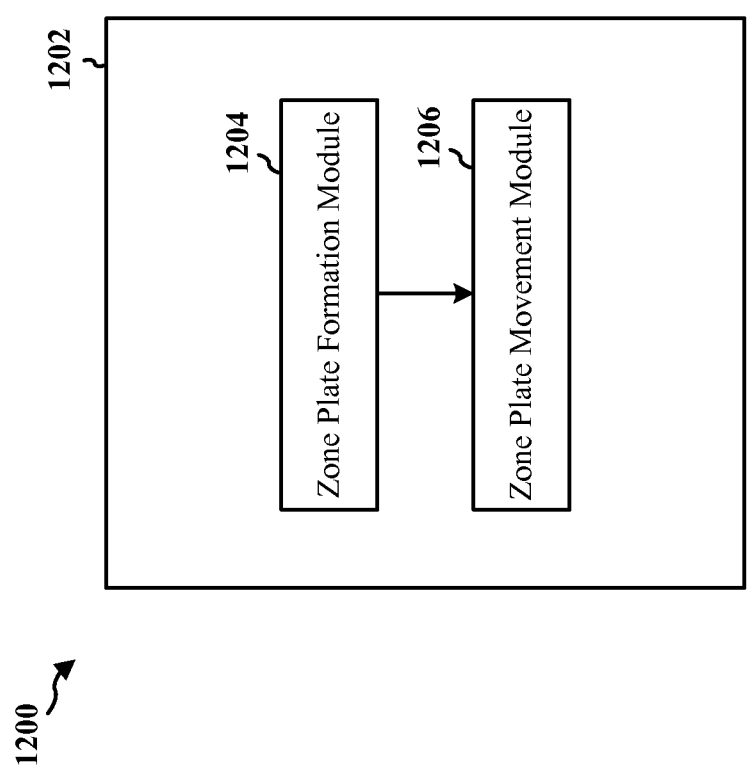
FIG. 12 is a conceptual data flow diagram illustrating the data flow between different modules/means/components in an exemplary apparatus.

FIG. 12 is a conceptual data flow diagram 1200 illustrating the data flow between different modules/means/components in an exemplary apparatus 1202. The apparatus may be a display. The apparatus includes a zone plate formation module 1204 that forms a plurality of zone plates in a liquid crystal using electric fields. Each zone plate has a center, and the centers are aligned along a first axis of the display. The apparatus also includes a zone plate movement module 1206 that moves the plurality of zone plates in a first direction along a second axis of the display different from the first axis of the display, while maintaining alignment of the centers of the zone plates along the first axis. Such movement is implemented by repositioning electric fields through the liquid crystal. In some configurations, the zone plate formation module may also control the focusing power of the zone plates to accommodate for a vision correction need of a user of the display, for example, by applying customized chirp distributions to one or more sets of electrodes.

The apparatus may include additional modules that perform each of the steps of the algorithm in the aforementioned flow chart of FIG. 11. As such, each step in the aforementioned flow charts of FIG. 11, and the further details of these steps as described herein, may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 13:
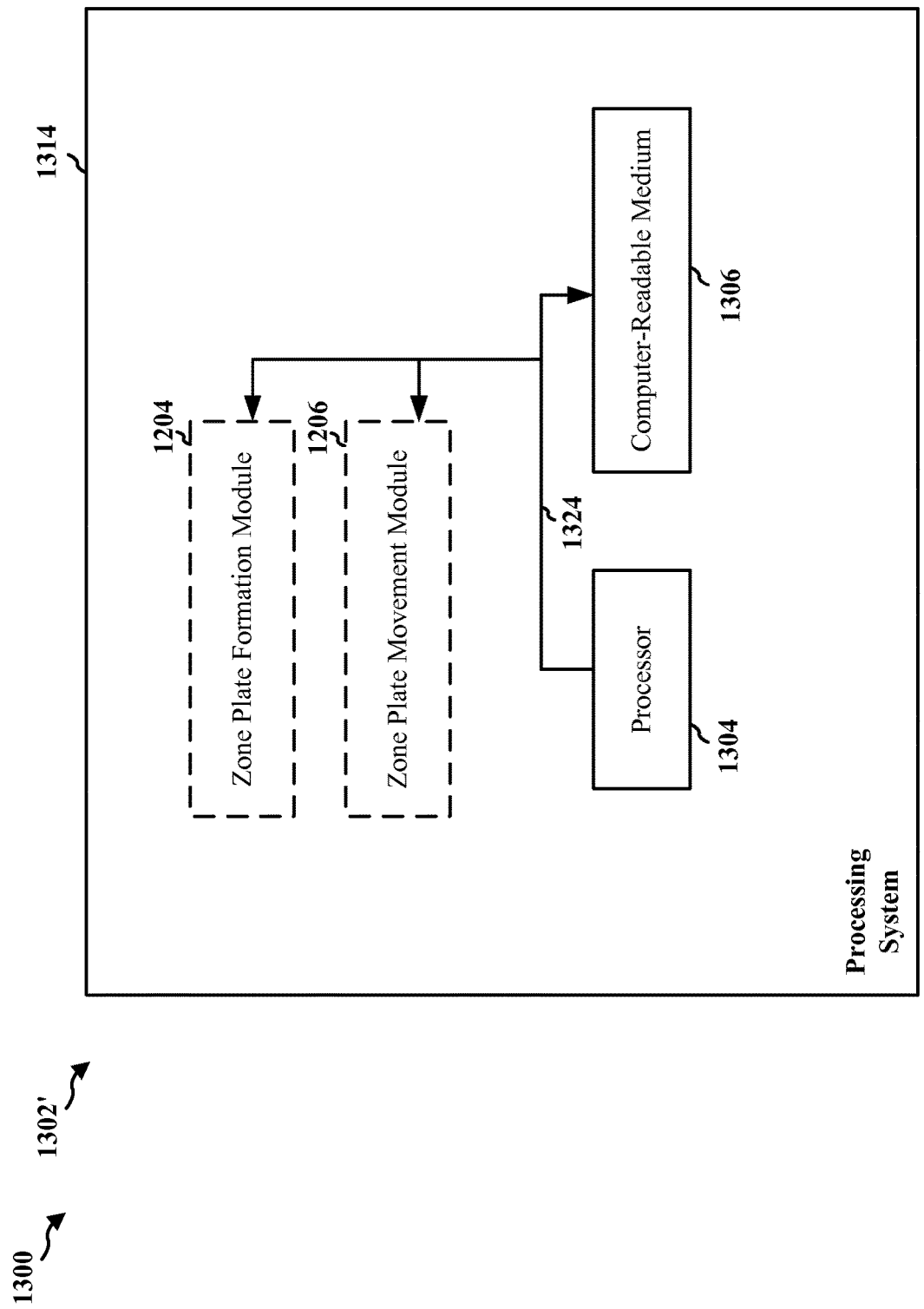
FIG. 13 is a diagram illustrating an example of a hardware implementation for an apparatus employing a processing system.

FIG. 13 is a diagram 1300 illustrating an example of a hardware implementation for an apparatus 1302' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware modules, represented by the processor 1304, the modules 1204, 1206, and the computer-readable medium 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The processing system 1314 includes a processor 1304 coupled to a computer-readable medium 1306. The processor 1304 is responsible for general processing, including the execution of software stored on the computer-readable medium 1306. The software, when executed by the processor 1304, causes the processing system 1314 to perform the various functions described supra for any particular apparatus. The computer-readable medium 1306 may also be used for storing data that is manipulated by the processor 1304 when executing software. The processing system further includes at least one of the modules 1204 and 1206. The modules may be software modules running in the processor 1304, resident/stored in the computer readable medium 1306, one or more hardware modules coupled to the processor 1304, or some combination thereof.

In one configuration, the display apparatus 1302/1302' includes means for forming a plurality of zone plates in a liquid crystal using electric fields. Each zone plate has a center and the centers are aligned along a first axis of the display. In one configuration, the means for forming the zone plates includes means for establishing electric fields between a plurality of electrode sets on a first side of the liquid crystal and an electrode set on a second side of the liquid crystal. The apparatus 1302/1302' also includes means for moving the plurality of zone plates in a first direction along a second axis of the display different from the first axis of the display, while maintaining alignment of the centers of the zone plates along the first axis. Such movement is provided by repositioning electric fields through the liquid crystal. The aforementioned means may be one or more of the aforementioned modules of the apparatus 1302 and/or the processing system 1314 of the apparatus 1302' configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claims is:

1. An optics display system comprising:
a polarizer configured to receive light from a natural scene and to polarize the natural-scene light so that the natural-scene light exiting the polarizer has a first polarization;
a glass assembly configured to direct light in a direction substantially normal to a surface of the glass assembly;
a light source coupled to the glass assembly and configured to launch light into the glass assembly, the launched light having a second polarization substantially orthogonal to the first polarization; and
a zone plate assembly comprising a liquid crystal plate, a first plurality of electrodes adjacent a first side of the liquid crystal plate, a second plurality of electrodes adjacent a second side of the liquid crystal plate, wherein the zone plate assembly receives both the natural-scene light and the launched light from the glass assembly, and a controller configured to:
establish a first plurality of electric fields between a first set of the first plurality of electrodes and a first set of the second plurality of electrodes to form at least one zone plate in the liquid crystal plate, the at least one zone plate configured to modulate the launched light without modulating the natural-scene light; and
disestablish the first plurality of electric fields and establish a second plurality of electric fields between a second set of the first plurality of electrodes and a second set of the second plurality of electrodes to reposition the at least one zone plate in the liquid crystal plate.

2. The optics display system of claim 1, wherein the controller establishes the first plurality of electric fields by being further configured to:
apply a voltage to one or more electrodes in the first set of the first plurality of electrodes; and
apply a voltage to one or more electrodes in the first set of the second plurality of electrodes.

3. The optics display system of claim 1, wherein the controller establishes the second plurality of electric fields by being further configured to:
apply a voltage to one or more electrodes in the second set of the first plurality of electrodes; and
apply a voltage to one or more electrodes in the second set of the second plurality of electrodes.

4. The optics display system of claim 1, wherein the first plurality of electric fields form a plurality of zone plates, each zone plate having a center, wherein the centers are aligned along a first axis of the zone plate assembly, and the second plurality of electric fields reposition the plurality of zone plates along a second axis of the zone plate assembly while maintaining alignment of the centers of the plurality of zone plates along the first axis.

5. The optics display system of claim 4, wherein at least two of the plurality of zone plates at least partially overlap.

6. The optics display system of claim 1, wherein the liquid crystal plate is a nematic liquid crystal that modulates the phase of light having the second polarization but does not substantially modulate light having the first polarization.

7. The optics display system of claim 1, wherein the zone plate assembly is adjacent the glass assembly.

8. An optics display system comprising:
means for receiving light from a natural scene and polarizing the natural-scene light so that the natural-scene light exiting the means for receiving and polarizing has a first polarization;
means for launching light into a glass assembly and directing the light in a direction substantially normal to the glass assembly, the launched light having a second polarization substantially orthogonal to the first polarization;
means for establishing a first plurality of electric fields in a liquid crystal plate to form at least one zone plate in the liquid crystal plate, wherein the zone plate receives both the natural-scene light and the launched light from the glass assembly, the at least one zone plate configured to modulate the launched light having the second polarization without modulating the natural-scene light having the first polarization; and
means for disestablishing the first plurality of electric fields and establishing a second plurality of electric fields in the liquid crystal plate to reposition the at least one zone plate in the liquid crystal plate.

9. The optics display system of claim 8, wherein the means for establishing the first plurality of electric fields is configured to:
apply a voltage to one or more electrodes in a first set of a first plurality of electrodes adjacent a first side of the liquid crystal plate; and
apply a voltage to one or more electrodes in a first set of a second plurality of electrodes adjacent a second side of the liquid crystal plate.

10. The optics display system of claim 9, wherein the means for establishing the second plurality of electric fields is configured to:
apply a voltage to one or more electrodes in a second set of the first plurality of electrodes; and
apply a voltage to one or more electrodes in a second set of the second plurality of electrodes.

11. The optics display system of claim 8, wherein the first plurality of electric fields form a plurality of zone plates, each zone plate having a center, wherein the centers are aligned along a first axis of a zone plate assembly, and the second plurality of electric fields reposition the plurality of zone plates along a second axis of the zone plate assembly while maintaining alignment of the centers of the plurality of zone plates along the first axis.

12. The optics display system of claim 11, wherein at least two of the plurality of zone plates at least partially overlap.

13. The optics display system of claim 8, wherein the liquid crystal plate is a nematic liquid crystal that modulates the phase of light having the second polarization but does not substantially modulate light having the first polarization.

14. The optics display system of claim 8, wherein the liquid crystal plate is adjacent the glass assembly.

15. A method of forming an image in an optics display system, said method comprising:
receiving light from a natural scene through a polarizer, and polarizing the natural-scene light so that the natural-scene light exiting the polarizer has a first polarization;
launching light into a glass assembly and directing the light in a direction substantially normal to the glass assembly, the launched light having a second polarization substantially orthogonal to the first polarization;
establishing a first plurality of electric fields in a liquid crystal plate to form at least one zone plate in the liquid crystal plate, wherein the zone plate receives both the natural-scene light and the launched light from the glass assembly, the at least one zone plate modulating the launched light having the second polarization without modulating the natural-scene light having the first polarization; and disestablishing the first plurality of electric fields and establishing a second plurality of electric fields in the liquid crystal plate to reposition the at least one zone plate in the liquid crystal plate, the at least one zone plate modulating the launched light having the second polarization without modulating the natural-scene light having the first polarization.

16. The method of claim 15, wherein establishing the first plurality of electric fields comprises:
applying a voltage to one or more electrodes in a first set of a first plurality of electrodes adjacent a first side of the liquid crystal plate; and
applying a voltage to one or more electrodes in a first set of a second plurality of electrodes adjacent a second side of the liquid crystal plate.

17. The method of claim 16, wherein establishing the second plurality of electric fields comprises:
applying a voltage to one or more electrodes in a second set of the first plurality of electrodes; and
applying a voltage to one or more electrodes in a second set of the second plurality of electrodes.

18. The method of claim 15, wherein the first plurality of electric fields form a plurality of zone plates, each zone plate having a center, wherein the centers are aligned along a first axis of a zone plate assembly, and the second plurality of electric fields reposition the plurality of zone plates along a second axis of the zone plate assembly while maintaining alignment of the centers of the plurality of zone plates along the first axis.

19. The method of claim 18, wherein at least two of the plurality of zone plates at least partially overlap.

20. The method of claim 15, wherein the liquid crystal plate is a nematic liquid crystal that modulates the phase of light having the second polarization but does not substantially modulate light having the first polarization.

* * * * *